United States Patent
Mihara

(10) Patent No.: US 6,678,322 B1
(45) Date of Patent: Jan. 13, 2004

(54) VIDEO DATA CODING DEVICE, VIDEO DATA CODING METHOD, VIDEO DATA TRANSMITTING DEVICE, AND VIDEO DATA RECORDING MEDIUM

(75) Inventor: Kanji Mihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/262,798

(22) Filed: Mar. 4, 1999

Related U.S. Application Data

(63) Continuation of application No. PCT/JP98/02970, filed on Jul. 1, 1998.

(30) Foreign Application Priority Data

Jul. 8, 1997 (JP) .............................................. 9-182738

(51) Int. Cl.$^7$ ................................................ H04B 1/66
(52) U.S. Cl. .............................................. 375/240.02
(58) Field of Search ................. 375/240.06, 240.07, 375/240.04, 240.23, 240.24, 240.19, 240.02, 240.05, 240.26; 348/384, 400, 401, 402, 404, 407, 420; 382/240, 242, 248, 232, 238, 239

(56) References Cited

U.S. PATENT DOCUMENTS

| | | | |
|---|---|---|---|
| 5,038,209 A | 8/1991 | Hang | 358/136 |
| 5,136,377 A | 8/1992 | Johnston et al. | 358/136 |
| 5,231,484 A | 7/1993 | Gonzales et al. | 358/133 |
| 5,265,180 A | 11/1993 | Golin | 348/384 |
| 5,287,200 A | 2/1994 | Sullivan et al. | 358/433 |
| 5,333,012 A * | 7/1994 | Singhal et al. | 375/240.04 |
| 5,379,355 A | 1/1995 | Allen | 382/56 |
| 5,396,567 A | 3/1995 | Jass | 382/56 |
| 5,404,168 A | 4/1995 | Yamada et al. | 348/405 |
| 5,410,351 A | 4/1995 | Kojima | 348/401 |

(List continued on next page.)

FOREIGN PATENT DOCUMENTS

| | | |
|---|---|---|
| EP | 0 475 251 A2 | 3/1992 |
| EP | 0 493 130 A2 | 7/1992 |
| EP | 0 509 576 A2 | 10/1992 |
| EP | 0 535 960 A3 | 4/1993 |
| EP | 0 535 960 A2 | 4/1993 |
| JP | 7-288810 | 10/1995 |
| JP | 8-336135 | 12/1996 |

OTHER PUBLICATIONS

Nicoulin et al., "Feed–back Free Rate Control for Digital Video Coding", Proceedings of the Picture Coding Symposium (PCS), Lausanne, Mar. 17–19, 1993, No. _, Mar. 17, 1993 Swiss Federal Institute of technology, pp. 19.3/A–19.3B., XP 000346426.

*Primary Examiner*—Vu Le
*Assistant Examiner*—Behrooz Senfi
(74) *Attorney, Agent, or Firm*—Frommer Lawrence & Haug LLP; William S. Frommer; Glenn F. Savit

(57) ABSTRACT

A coding preprocessing section supplies, to a CPU 6, a statistic quantity (index data) indicating characteristics of source video data to be coded. The CPU 6 calculates a coding difficulty indicating difficulty in coding the video data, and calculates a target quantity of codes allocated of each picture of the video data, on the basis of the coding difficulty. By feeding forward the calculated target quantity of codes to an encoder 4, the CPU 6 can carry out coding processing in real time without carrying out encode processing twice as in conventional two-pass encode processing. In addition, since the target quantity of codes corresponding to the coding difficulty of the video data is calculated, optimum coding corresponding to the pattern of the video data can be realized.

24 Claims, 10 Drawing Sheets

U.S. PATENT DOCUMENTS

| | | | |
|---|---|---|---|
| 5,426,463 A | | 6/1995 | Reininger et al. ........... 348/405 |
| 5,434,623 A | | 7/1995 | Coleman et al. ............. 348/405 |
| 5,461,422 A | | 10/1995 | Hsieh .......................... 348/405 |
| 5,559,557 A | * | 9/1996 | Kato ...................... 375/240.03 |
| 5,691,775 A | | 11/1997 | Astle ........................... 348/416 |
| 5,703,646 A | | 12/1997 | Oda ............................ 348/401 |
| 5,774,593 A | | 6/1998 | Zick et al. ................... 382/236 |
| 5,835,149 A | | 11/1998 | Astle ........................... 348/405 |
| 5,929,914 A | | 7/1999 | Normand ..................... 348/405 |
| 5,933,532 A | | 8/1999 | Mihara ........................ 382/232 |
| 6,151,360 A | * | 11/2000 | Kato et al. .............. 375/240.03 |
| 6,188,792 B1 | * | 2/2001 | Chujoh et al. ............... 382/236 |
| 6,208,691 B1 | * | 3/2001 | Balakrishnan et al. .. 375/240.12 |
| 6,222,881 B1 | * | 4/2001 | Walker ................... 375/240.03 |
| 6,337,879 B1 | | 1/2002 | Mihara et al. ............... 375/240 |

\* cited by examiner

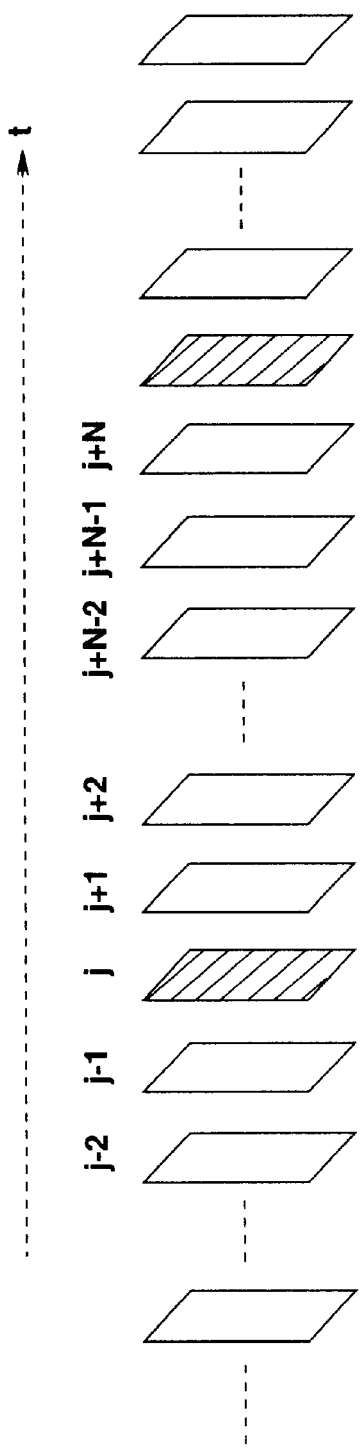
FIG.5A
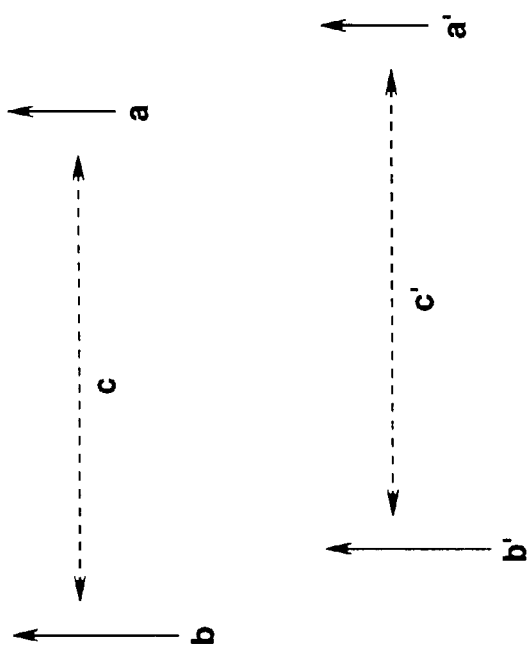
FIG.5B j-TH PROCESSING
FIG.5C (j+1)TH PROCESSING

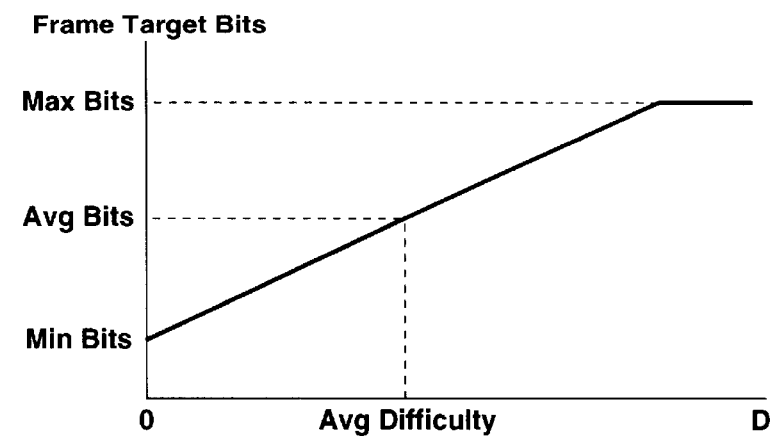
FIG.10A I Picture
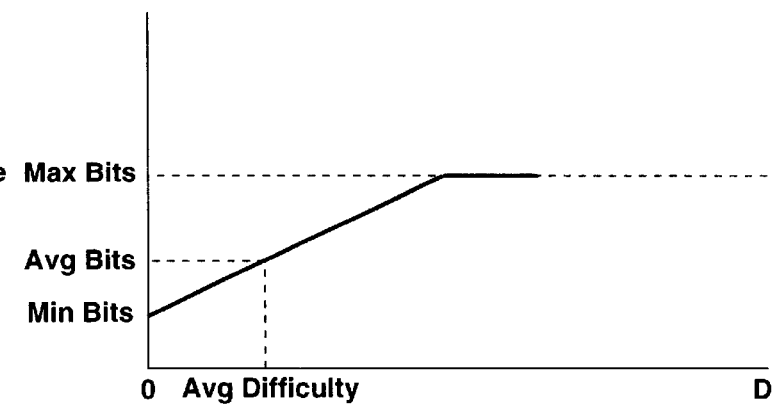
FIG.10B P Picture
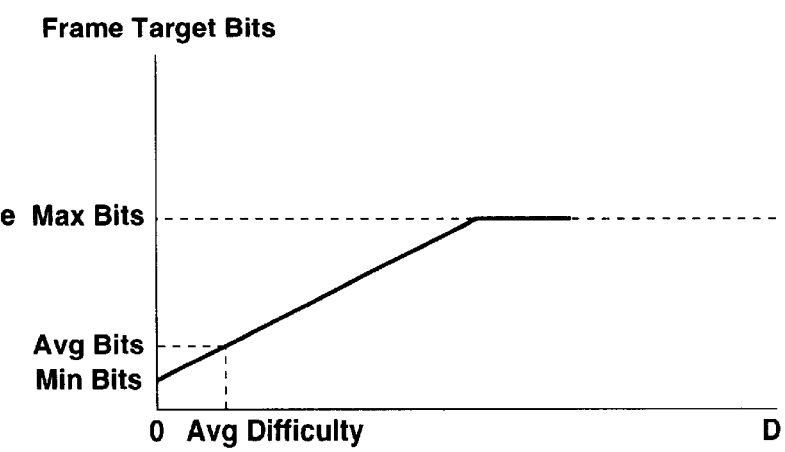
FIG.10C B Picture

VIDEO DATA CODING DEVICE, VIDEO DATA CODING METHOD, VIDEO DATA TRANSMITTING DEVICE, AND VIDEO DATA RECORDING MEDIUM

This is a continuation of copending International Application PCT/JP98/02970 having an international filing date of Jul. 1, 1998.

TECHNICAL FIELD

This invention relates to video data coding device and method for compression-coding source video data in accordance with the coding difficulty, a video data recording medium for recording coded data obtained by the device and method, and a video data transmitting device for coding video data by using a source video data coding device and transmitting the coded video data.

BACKGROUND ART

Recently, in order to carry out compression coding of source video data, a technique based on the MPEG (Moving Picture Experts Group) or MPEG2 standard employing motion compensation (MC) in combination with redundancy reduction processing by orthogonal transform such as discrete cosine transform (DCT) has been broadly used.

This MPEG technique is used for a storage system for compression-coding each group of pictures (GOP) as a unit consisting of an intra-picture (I-picture), a predictive-picture (P-picture) and a bidirectionally predictive-picture (B-picture) and recording the compressed data onto a recording medium such as a digital disk (for example, a magneto-optical (MO) disk). The MPEG technique is also used for an authoring system for recording compressed data onto a master disk.

In such storage system and authoring system, the storage capacity of the recording medium is limited, and therefore, the quantity of data (bits) of compressed data after compression coding must be made not greater than the storage capacity of the recording medium while high quality of image after expansion decoding is maintained.

The present Assignee has proposed a technique, referred to as "two-pass encode", for temporarily encoding a video signal input by a fixed quantization value, then collecting data such as the quantity of generated bits, and from the result thereof, determining allocation (target quantity of codes) of the bit rate in variable rate encoding at the time of regular encoding. This two-pass encode system is an encoding method for optimally allocating bits to video data to be coded, in accordance with the coding difficulty of video images.

FIG. 1 is a conceptual view showing an entire two-pass encode system which is used in a DVD authoring system for recording coded video data onto a digital video disk (DVD) or a storage system for recording coded video data onto an MO disk.

In this two-pass encode system, in the first pass, a video signal input (Video Input) is preliminarily compression-coded by an encoder of fixed quantization to estimate the quantity of generated bits after compression coding as coding difficulty, and this estimated quantity of generated bits is supplied to an external computer. Then, the external computer supplies the target quantity of codes based on the quantity of generated bits, that is, the coding difficulty, to the encoder. In the second pass, the encoder carries out encoding in accordance with the target quantity of codes, and outputs a bit stream, which is coded data.

The two-pass encode system provides a satisfactory encode effect in terms of picture quality. However, from the viewpoint of operation efficiency, since encode operation must be carried out at least twice, there is such a problem that a long encode time is required.

Also, in the storage system for recording coded video data by using an optical disk or a tape streamer in place of VTR, encode processing needs to be carried out in real time. Therefore, in such a storage system with the conventional technique, only encoding at a fixed coding rate can be carried out regardless of the picture quality of video data to be coded.

In short, the conventional authoring system or storage system has such a problem that it is impossible to code source video data in real time while improving the picture quality of coded video data to be recorded on a storage medium.

Meanwhile, this MPEG technique is also used in a transmission system of digital broadcast for transmitting picture data as digital data. The advantage of digital broadcast is that a greater quantity of program data (hereinafter referred to as programs) than in analog broadcast can be transmitted on the same transmission line. In compression coding of a picture in this transmission system of digital broadcast, it is necessary to maintain high picture quality while restraining the quantity of data (bits) after compression coding to not more than the transmission capacity of the transmission line, similarly to the case of the storage system or authoring system. In the conventional transmission system, a "statistical multiplexing" method is employed as a method for transmitting a greater quantity of programs to a transmission line of a predetermined transmission capacity. Statistical multiplexing is a method for allocating an optimum transmission rate to each program by dynamically changing the transmission rate of each program in accordance with the contents of the program. This statistical multiplexing is adapted for reducing the transmission rate with respect to a program having video data of simple patterns which do not require a large quantity of bits in coding, and increasing the transmission rate with respect to a program having video data of complex patterns which require a large quantity of bits in coding.

In such a transmission system of digital broadcast, live video programs such as sports programs and news programs must be transmitted in real time. However, the above-described two-pass encode system has such a problem that live video programs cannot be transmitted in real time, unless the video programs are transmitted at a fixed coding rate ignoring the picture quality. In short, in the conventional transmission system, programs of high picture quality cannot be transmitted in real time.

DISCLOSURE OF THE INVENTION

In view of the foregoing status of the art, it is an object of the present invention to provide video data coding device and method for carrying out, in real time, variable rate coding for realizing good picture quality, and a recording medium for coded data. Also, it is another object of the present invention to provide a video data transmitting device for transimnitting, in real time, data compression-coded by variable rate coding processing for realizing good picture quality.

In order to solve the above-described problem, in a video data coding device according to the present invention, a target quantity of codes to be distributed to input video data is calculated on the basis of index data indexing characteristics of the input video data, and in accordance with the target quantity of codes, coding processing is carried out on the input video data delayed by delay means.

That is, according to the present invention, there is provided a video data coding device for coding input video data supplied thereto, the device including: target quantity of codes calculation means for calculating a target quantity of codes to be distributed to the input video data on the basis of index data indexing characteristics of the input video data; delay means for delaying the input video data by a predetermined time period; and coding processing means for carrying out coding processing in accordance with the target quantity of codes with respect to the input video data delayed by the delay means.

In this case, the time period by which the delay means delays the input video data is a predetermined time period longer than a time period during which the target quantity of codes calculation means calculates the target quantity of codes. Consequently, the index data is precedently read. This precedent reading is carried out, for example, within 0.5 seconds of one GOP.

The target quantity of codes calculation means finds a coding difficulty indicating the difficulty at the time of coding from the index data, and calculates the target quantity of codes to be distributed to the video data on the basis of the coding difficulty.

Also, the target quantity of codes calculation means updates, at any time, the corresponding relation of the target quantity of codes based on the coding difficulty, in accordance with coding difficulties that have already been collected and the quantity of codes generated by the coding processing means.

In order to solve the above-described problem, in a video data coding method according to the present invention, a target quantity of codes to be distributed to input video data is calculated on the basis of index data indexing characteristics of the input video data, and in accordance with the target quantity of codes, coding processing is carried out on the input video data delayed at a delay step.

That is, according to the present invention, there is also provided a video data coding method for coding supplied input video data, the method including: a target quantity of codes calculation step of calculating a target quantity of codes to be distributed to the input video data on the basis of index data indexing characteristics of the input video data; a delay step of delaying the input video data by a predetermined time period; and a coding processing step of carrying out coding processing in accordance with the target quantity of codes with respect to the input video data delayed at the delay step.

In this case, the time period by which the input video data is delayed at the delay step is a predetermined time period longer than a time period during which the target quantity of codes is calculated at the target quantity of codes calculation step. Consequently, the index data is precedently read. This precedent reading is carried out, for example, within 0.5 seconds of one GOP.

At the target quantity of codes calculation step, a coding difficulty indicating the difficulty at the time of coding is found from the index data, and the target quantity of codes to be distributed to the video data is calculated on the basis of the coding difficulty.

Also, at the target quantity of codes calculation step, the corresponding relation of the target quantity of codes based on the coding difficulty is updated at any time, in accordance with coding difficulties that have already been collected and the quantity of codes generated at the coding processing step.

In the video data coding device of the present invention, a coding preprocessing section supplies, to a CPU, a statistic quantity (index data) indicating characteristics of source video data to be coded. The CPU calculates a coding difficulty indicating the difficulty in coding the video data, on the basis of the statistic quantity, and calculates a target quantity of codes allocated to each picture of the video data, on the basis of the coding difficulty. In addition, the CPU feeds forward the calculated target quantity of codes to an encoder, thereby enabling coding processing in real time without carrying out encode processing twice as in the conventional two-pass encode processing. Moreover, in the video data coding device of the present invention, since the target quantity of codes in accordance with the coding difficulty of video data is calculated, optimum coding in accordance with the pattern of video data can be realized.

In the video data coding device and method of the present invention, the CPU calculates a coding difficulty $D_j$ indicating the coding difficulty in coding source video data from the source video data to be coded itself, and calculates a target quantity of codes $T_j$ used in coding the source video data to be coded, on the basis of the calculated coding difficulty. Then, the CPU supplies the calculated target quantity of codes $T_j$ to an encoder in a manner of feed forward, thereby enabling coding based on the target quantity of codes in accordance with the pattern of the source video data to be coded and also enabling coding of the video data in real time.

In addition, in the video data coding device of the present invention, since the coding difficulty is proximately calculated for each picture type by using intra-AC or ME residual found from the source video data to be coded, the coding difficulty can be obtained before the video data to be coded is actually encoded. Therefore, real-time coding processing can be realized.

Moreover, in the video data coding device of the present invention, if the picture type of video data to be coded is I-picture, the coding difficulty is calculated from intra-AC, whereas if the picture type of video data to be coded is P-picture or B-picture, the coding difficulty is calculated from ME residual. Thus, the coding difficulty with high precision can be calculated in accordance with the picture type.

In addition, in the video data coding device of the present invention, since a conversion formula for calculating the target quantity of codes from the calculated coding difficulty is corrected at any time on the basis of the actually generated coding quantity as a result of the past coding processing by coding means, the target quantity of codes adapted to a change of pattern of video data and target coding corresponding to the remaining quantity of a storage medium can be set. Furthermore, as the conversion formula for calculating the target quantity of codes from the coding difficulty, different conversion formulas are set in accordance with the picture type of the video data to be coded. Therefore, the optimum coding difficulty can be calculated not only on the GOP basis but also on the picture basis.

Moreover, in the video data coding device of the present invention, the operation expression for calculating the coding difficulty is updated at any time on the basis of global complexity found from the quantity of generated codes and the quantization value of coding processing by coding means. Therefore, the coding difficulty in accordance with a change of pattern of video data can be detected with higher precision.

In addition, in the video data coding device of the present invention, the CPU calculates, for each picture, coding difficulties related to a plurality of pictures included in a reference GOP to be a target of coding processing by coding means, and calculates the target quantity of codes allocated to the reference GOP from the plurality of coding difficulties calculated by coding difficulty calculation means. The CPU distributes the target quantity of codes allocated to the reference GOP, to each picture included in the reference GOP in accordance with the picture type, thereby calculating the target quantity of codes corresponding to each picture included in the reference GOP. Thus, different target quantities of codes in accordance with the picture type can be allocated to the respective pictures while an average quantity of codes designated to the GOP is maintained within the GOP.

According to the present invention, there is also provided a video data transmitting device for coding input video data supplied thereto and transmitting the coded video data, the device including: target quantity of codes calculation means for calculating a target quantity of codes to be distributed to the input video data on the basis of index data indexing characteristics of the input video data; delay means for delaying the input video data by a predetermined time period; and coding transmission means for carrying out coding processing in accordance with the target quantity of codes with respect to the input video data delayed by the delay means and transmitting the coded video data.

According to the present invention, there is also provided a video data transmitting device for coding source video data and transmitting the coded video data, the device including: coding difficulty calculation means for calculating a coding difficulty indicating the coding difficulty in coding the source video data; target quantity of codes calculation means for updating, at any time, an operation expression for calculating a target quantity of codes used in coding the source video data from the calculated coding difficulty, on the basis of the quantity of generated codes in the past coding processing, and calculating the target quantity of codes from the coding difficulty on the basis of the updated conversion formula; coding means for feeding forward the target quantity of codes calculated by the target quantity of codes calculation means, thereby coding the source video data to be coded in real time on the basis of the target quantity of codes corresponding to the source video data to be coded; and transmission means for transmitting the video data coded by the coding means.

According to the present invention, there is further provided a video data recording medium in which coded data is recorded, the coded data being obtained by calculating a target quantity of codes to be distributed to input video data on the basis of index data indexing characteristics of the input video data, and then carrying out coding processing in accordance with the target quantity of codes with respect to the input video data delayed by a predetermined time period.

BRIEF DESCRIPTION OF THE DRAWINGS

FIGS. 5A to 5C are timing charts for explaining the operation of the embodiment.

FIGS. 10A to 10C are graphs of the frame target quantity of codes with respect to the coding difficulty of I-, P- and B-pictures, respectively.

BEST MODE FOR CARRYING OUT THE INVENTION

Preferred embodiments of the video data coding device and method according to the present invention will now be described with reference to the drawings.

Figure 1:
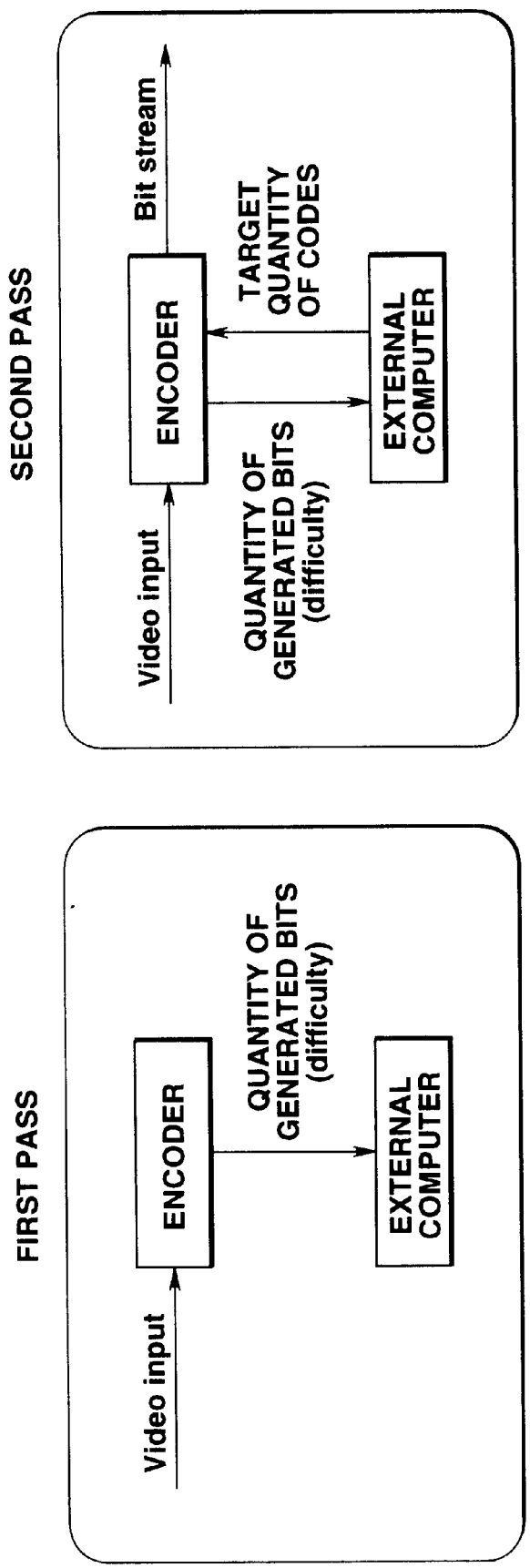
FIG. 1 is a view for explaining a conventional two-pass encode system.
Figure 2:
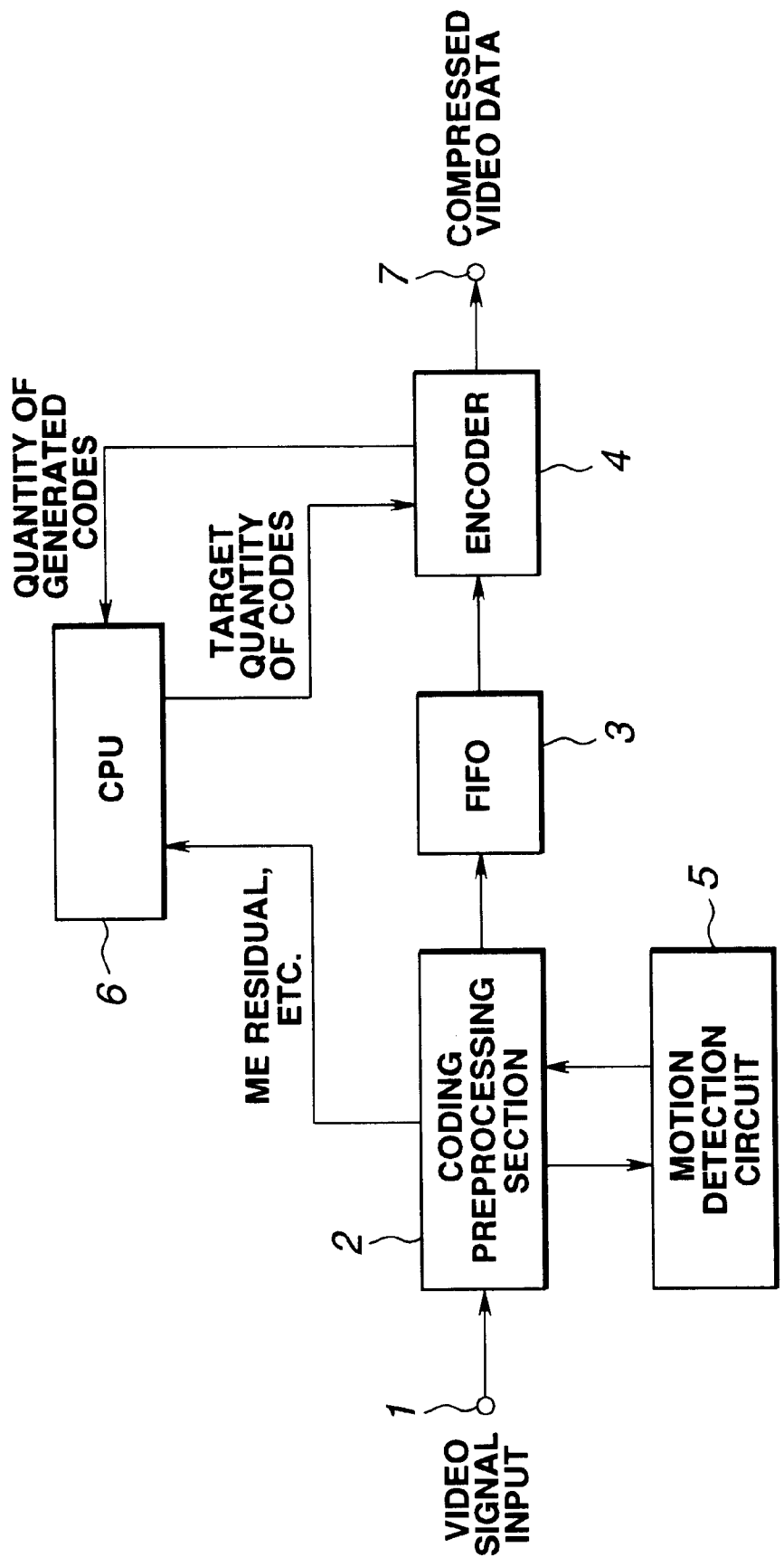
FIG. 2 is a block diagram showing an embodiment of the video data coding device and method according to the present invention.

FIG. 2 is a view showing the structure of a video data coding device according to an embodiment of the present invention. This video data coding device includes a coding preprocessing section 2 for calculating index data indexing characteristics of an input video signal inputted from an input terminal 1, and a central processing unit (CPU) 6 as target quantity of codes calculation means for finding a coding difficulty indicating difficulty at the time of coding the input video signal on the basis of the index data from the coding preprocessing section 2 and calculating a target quantity of codes to be distributed to the video signal on the basis of the coding difficulty. The video data coding device also includes a FIFO memory 3 as delay means for delaying the input video signal by a predetermined time period, and an encoder 4 for carrying out coding processing in accordance with the target quantity of codes with respect to the input video signal delayed by the FIFO 3 and supplying the compressed video data to an output terminal 7.

In the case where the coding device shown in FIG. 2 is applied to a storage system or an authoring system, coded video data outputted from the output terminal 7 is stored on a data storage medium such as an optical disk. In the case where this coding device is applied to a transmission system of digital broadcast or the like, coded video data outputted from the output terminal 7 is multiplexed with other coded video programs and then transmitted to a receiving device through a transmitting device or a satellite, not shown.

The CPU 6 may be constituted in a casing unit including the coding preprocessing section 2, the FIFO 3 and the encoder 4, or may be constituted as a computer for controlling the coding preprocessing section 2, the FIFO 3 and the encoder 4.

The index data supplied from the coding preprocessing section 2 to the CPU 6 is exemplified by ME residual, flatness, and intra-AC as later described.

The coding preprocessing section 2 notifies the CPU 6 of the presence/absence of pictures of a video signal input from the input terminal 1, and carries out preprocessing for compression coding for each picture of the video signal input. In short, the coding preprocessing section 2 rearranges video data in a GOP of the input video data into the coding order, and carries out picture-field conversion. The coding preprocessing section 2 carries out 3:2 pull-down conversion processing (for converting video data of 24 frames/sec of a motion picture to video data of 30 frames/sec and removing redundancy before compression coding) in the case where the input video data is video data of a motion picture, and outputs the converted data to the FIFO 3. Also, the coding preprocessing section 2 supplies to the CPU 6 the index data such as ME residuals, flatness, and intra-AC as later described.

A motion detection circuit 5 detects motion vectors of the video signal input and outputs the detected motion vectors to the coding preprocessing section 2. Also, this motion detection circuit 5 generates ME residuals.

The FIFO 3 delays video data inputted from the coding preprocessing section 2, for example, input video data, by a predetermined time period and outputs the delayed video data to the encoder 4. This predetermined time period is longer than a time period during which the CPU 6 calculates the target quantity of codes.

The compression coding section including the coding preprocessing section 2, the FIFO 3, the encoder 4 and the motion detection circuit 5 will now be described further in detail with reference to FIG. 3.

Figure 3:
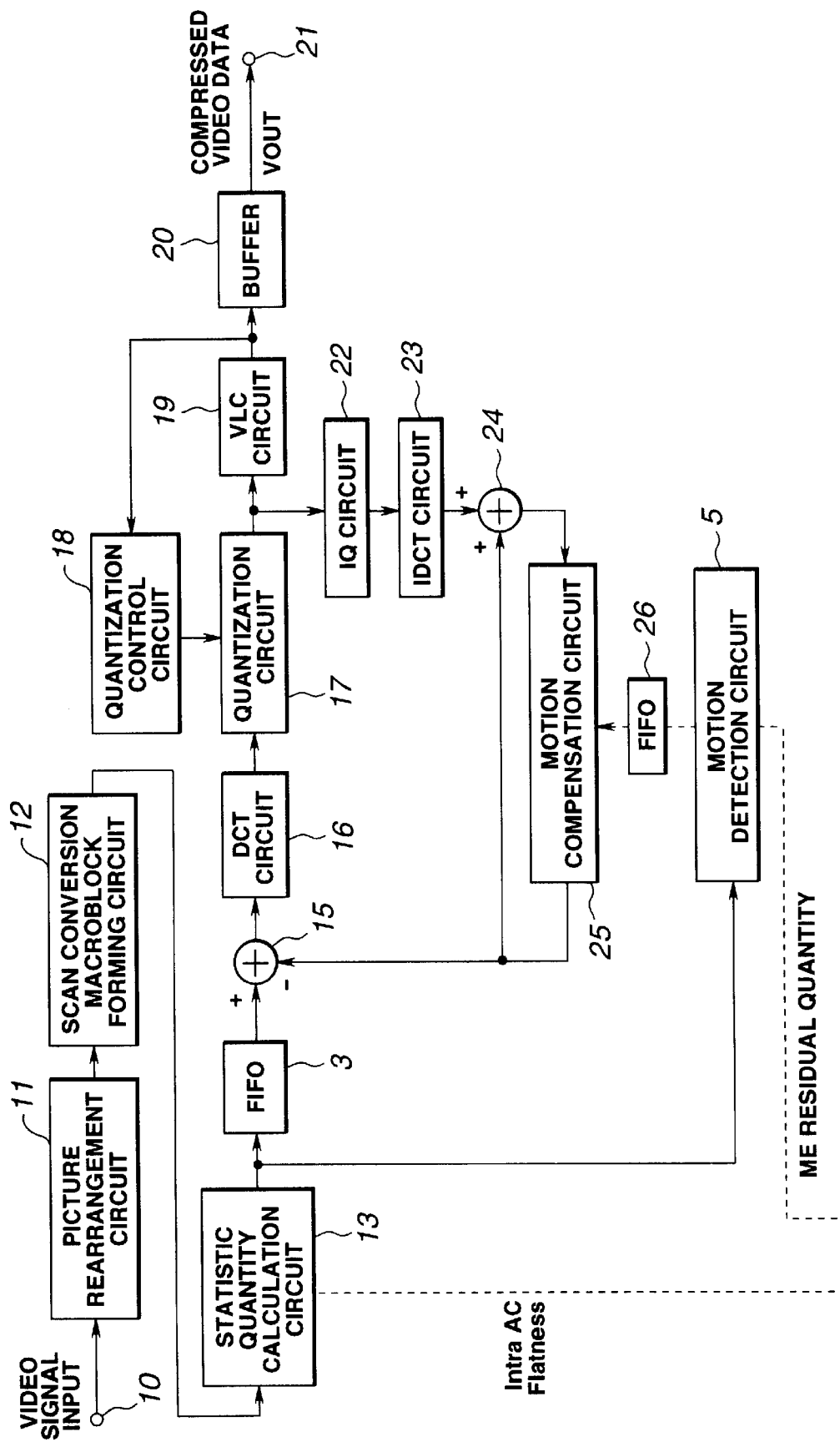
FIG. 3 is a block diagram showing the detailed structure of a compression coding section, which is an essential part of the embodiment.

In the compression coding section of FIG. 3, a picture rearrangement circuit 11, a scan conversion macroblock forming circuit 12 and a statistic quantity calculation circuit 13 constitute the coding preprocessing section 2 of FIG. 2.

The picture rearrangement circuit 11 rearranges an inputted video signal in the coding order. The scan conversion macroblock forming circuit 12 carries out field-frame conversion and forms a macroblock. For example, the scan conversion macroblock forming circuit 12 carries out 3:2 pull-down conversion, if the video signal input is a video signal of a motion picture.

The statistic quantity calculation circuit 13 calculates the statistic quantity such as flatness and intra-AC from a picture which is processed by the picture rearrangement circuit 11 and the scan conversion macroblock forming circuit 12 and compression-coded to an I-picture.

In the compression coding section of FIG. 3, an addition circuit 15, a DCT circuit 16, a quantization circuit 17, a quantization control circuit 18, a variable length coding (VLC) circuit 19, a buffer 20, a inverse quantization (IQ) circuit 22, a inverse DCT (IDCT) circuit 23, an addition circuit 24, and a motion compensation circuit 25 constitute the encoder 4 of FIG. 2.

The addition circuit 15 subtracts output data of the addition circuit 24 from the input video data from the FIFO 3, and outputs the resultant data to the DCT circuit 16.

The DCT circuit 16 carries out discrete cosine transform (DCT) on the video data inputted from the addition circuit 15 with respect to each macroblock consisting of 16×16 pixels so as to transform data of the time domain to data of the frequency domain, and outputs the data of the frequency domain to the quantization circuit 17.

The quantization circuit 17 quantizes the data of the frequency domain inputted from the DCT circuit 16 by a fixed or arbitrary quantization value, and outputs the quantized data to the variable length coding (VLC) circuit 19 and the inverse quantization circuit 22.

The variable length coding circuit 19 carries out variable length coding on the quantized data inputted from the quantization circuit 17, and supplies compressed video data as a result of variable length coding to the buffer 20. The buffer 20 buffers the compressed video data and supplies a bit stream consisting of the compressed video data to an output terminal 21.

The inverse quantization circuit 22 inversely quantizes the quantized data inputted from the quantization circuit 17 and outputs the inversely quantized data to the inverse DCT circuit 23.

The inverse DCT circuit 23 carries out inverse DCT on the inversely quantized data inputted from the inverse quantization circuit 22 and outputs the resultant data to the addition circuit 24.

The addition circuit 24 adds output data of the motion compensation circuit 25 and output data of the inverse DCT circuit 23, and outputs the addition result to the addition circuit 15 and the motion compensation circuit 25.

The motion compensation circuit 25 carries out motion compensation on the output data of the addition circuit 24 on the basis of the motion vector calculated by the motion detection circuit 5 with respect to a reference frame, and outputs the resultant data to the addition circuit 15.

A FIFO 26, provided between the motion compensation circuit 25 and the motion detection circuit 5, delays the motion vector. Since the motion vector has a smaller information quantity than picture data, the FIFO 26 may have a smaller capacity than FIFO 3.

With the above-described structure, the video data coding device of the embodiment of the present invention adaptively calculates a target quantity of data $T_j$, by using the statistic quantity such as flatness and intra-AC of the video input signal and the prediction error quantity of motion prediction (ME residual) in place of the coding difficulty of the pattern of the input video signal. Then, the video data coding device compression-codes the input video signal to compression-coded video data of an appropriate data quantity, in accordance with the target quantity of data $T_j$.

In this video data coding device, the motion detection circuit 5 and the statistic quantity calculation circuit 13 generate index data of the statistic quantity and the ME residual that are detected in advance, and determine the target quantity of data $T_j$ based on the index data. This compression coding system is hereinafter referred to as a feed forward rate control system.

The ME residual is defined as the absolute value sum or square value sum of difference values between video data of pictures to be compressed and video data of a reference pictures. The ME residual is calculated by the motion detection circuit 5 from pictures that become P-pictures and B-pictures after compression. It expresses the speed of motion of an image and the complexity of pattern, and has correlation with the coding difficulty and the data quantity after compression.

As for I-pictures, the ME residual cannot be found because these pictures are compression-coded without referring to other pictures. As index data (parameters) in place of the ME residual, the flatness and intra-AC are used.

The flatness is a parameter which is newly defined as index data expressing spatial flatness of an image, in order to realize the video data coding device. It indexes the complexity of the image and has correlation with the coding difficulty and the data quantity after compression.

The intra-AC is a parameter which is newly defined as the sum of dispersion value between each DCT block of the DCT processing unit in the MPEG system and image data, in order to realize the video data coding device. Similar to the flatness, the intra-AC indexes the complexity of the image and has correlation with the coding difficulty and the data quantity after compression.

The method for finding the coding difficulty (so-called difficulty) with high precision by using these parameters is disclosed in detail in the specification and drawings of the Japanese Patent Application No. Hei 8-214708, "Video Data Compressing Device and Method Therefor," filed by the present Assignee on Aug. 14, 1996 (and the U.S. patent application Ser. No. 08/909,448, filed on Aug. 11, 1997.)

The coding difficulty (hereinafter properly denoted by $D_j$) with respect to each picture is data indicating the difficulty of coding at the time of coding the image pattern. As the pattern becomes more complicated, the coding difficulty becomes higher. On the contrary, as the pattern is more simplified, the coding difficulty is lowered.

The target quantity of codes $T_j$ is calculated on the basis of the coding difficulty $D_j$. Specifically, the ME residual, flatness and intra-AC have strong correlation with the coding difficulty. $D_j$. Therefore, the coding difficulty $D_j$ is calculated from the index data such as the ME residual, flatness and intra-AC, and the target quantity of codes $T_j$ can be calculated from the calculated coding difficulty $D_j$. In this case, the index data can be detected by the encoder control circuit 2 and the motion detection circuit 5 shown in FIG. 2. That is, unlike the conventional technique, it is not necessary to find the coding difficulty in advance by using the two-pass encode system.

First, the ME residual will be described in detail. In carrying out compression coding with reference to other pictures to generate P-pictures and B-pictures, the motion detection circuit 5 searches a macroblock which realizes the minimum absolute value sum or square value sum of difference value between a noted macroblock of a picture (input picture) as a compression target and a macroblock of a picture (reference picture) to be referred to, and thus finds the motion vector. In short, the ME residual is defined as the sum of the minimum absolute value sum or square value sum of difference value of the respective macroblocks, with respect to the whole picture, in finding the motion vector.

This ME residual has extremely strong correlation with the coding difficulty $D_j$ such as to realize substantially direct proportion to the coding difficulty $D_j$. Thus, before compression coding, the coding difficulty $D_j$ of a picture to be a P-picture or B-picture is found from the ME residual, and the target quantity of codes $T_j$ with respect to the P-picture or B-picture can be calculated. The specific operation expression thereof will be described later.

Figure 4:
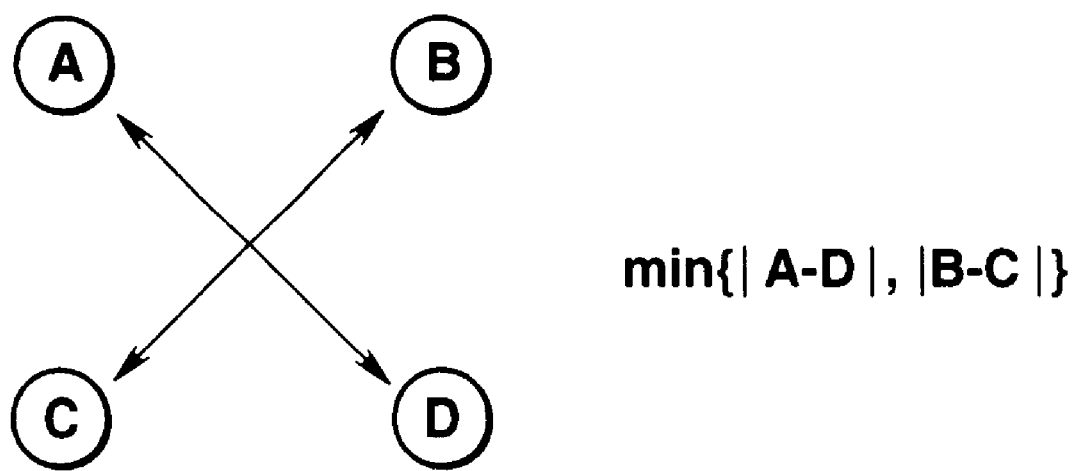
FIG. 4 is a view for explaining the principle for calculation of flatness.

Next, the flatness will be described in detail. The flatness is data expressing spatial flatness of the image. The flatness is calculated by first dividing a DCT block as a DCT processing unit in the MPEG system into subblocks each consisting of 2×2 pixels, then calculating the difference value of diagonal pixel data (pixel values) in these subblocks, then comparing the difference value with a predetermined threshold value, and finding the total number of subblocks having the difference value smaller than the threshold value for each picture, as shown in FIG. 4. The flatness value becomes smaller if the image pattern becomes spatially complicated. The flatness value is greater if the image pattern is flatter. This flatness has strong negative correlation with the coding difficulty $D_j$. Thus, before compression coding, the coding difficulty $D_j$ of a picture to be an I-picture is found from the flatness, and the target quantity of codes $T_j$ with respect to the I-picture can be found from the flatness.

The intra-AC is calculated as the sum of absolute values of differences between pixel values of the respective pixels in a DCT block and the average value of the pixel values in the DCT block, for each DCT block. That is, the intra-AC (Intra__AC) is found by the following equation.

$$\text{Intra}\_AC = \Sigma |f(x, y) - (\Sigma f)/N|$$

In this equation, $f(x, y)$ expresses the pixel value of each pixel in the DCT block, and $\Sigma f$ expresses the sum of pixel values in the DCT block. N expresses the number of pixels in the DCT block, and $\Sigma \|$ expresses the sum with respect to the pixels in the DCT block.

As described above, in the case where the type of a picture to be coded is I-picture, the intra-AC found by the above-mentioned equation and the coding difficulty $D_j$ have strong positive correlation. Thus, the coding difficulty $D_j$ of the picture to be an I-picture can be found from the intra-AC on the basis of the following equation (1).

$$D_j = a_I \times \text{Intra}\_AC + b_I \quad (1)$$

In this equation, $a_I$ and $b_I$ are simply a coefficient and a constant for finding the coding difficulty $D_j$ with respect to the I-picture from the intra-AC.

Similarly, using the following equation (2) for the P-picture or using the following equation (3) for the B-picture, the coding difficulty $D_j$ can be calculated from the ME residual by the CPU 6.

$$D_j = a_P \times \text{ME}\_\text{resid}_j + b_P \quad (2)$$

$$D_j = a_B \times \text{ME}\_\text{resid}_j + b_B \quad (3)$$

Next, the operation of the CPU 6 for finding the coding difficulty $D_j$ by using the index data (ME residual, intra-AC, or flatness) will be described with reference to FIGS. 2, 3 and 5.

The picture rearrangement circuit 11 of the coding preprocessing section 2 rearranges a video signal input in the coding order, and the scan conversion macroblock forming circuit 12 carries out picture-field conversion. In addition, the statistic quantity calculation circuit 13 carries out arithmetic processing based on the above-mentioned equation for finding the intra-AC with respect to a picture to be compression-coded to an I-picture, thus calculating the statistic quantity such as flatness and intra-AC.

The motion detection circuit 5 generates motion vectors with respect to pictures to be compression-coded to a P-picture and a B-picture, and calculates the ME residual.

The FIFO 3 delays the source video signal inputted thereto by the amount of N pictures. This "N" is an integer expressing the number of pictures included in one GOP (group of pictures).

With respect to the picture to be coded as an I-picture, the CPU 6 carries out arithmetic processing of equation (1) using the flatness and intra-AC outputted from the statistic quantity calculation circuit 13, thus generating the coding difficulty $D_j$ for the I-picture. With respect to the pictures to be coded as a P-picture and a B-picture, the CPU 6 carries out arithmetic processing of equations (2) and (3) using the ME residual generated by the motion detection circuit 5, thus calculating the coding difficulty $D_j$ for the P-picture and B-picture, respectively.

At the same time, the coding preprocessing section 2 carries out preprocessing such as rearrangement of pictures in the coding order with respect to the video signal input, and outputs video data as shown in FIG. 5A to the FIFO 3. By the rearrangement of pictures by the coding preprocessing section 2, the coding order of pictures shown in FIGS. 5A to 5C is caused to differ from the display order after expansion decoding.

The FIFO 3 delays each picture of the inputted video data by the amount of N pictures and outputs the delayed video data to the encoder 4. Since the delayed video data inputted to the encoder 4 is delayed by the amount of N pictures by the FIFO 3, when the encoder 4 is compression-coding the j-th picture (picture b of FIG. 5B) of the delayed video data as shown in FIG. 5B, the coding preprocessing section 2 takes out the index data from the (j+N)th picture (picture a of FIG. 5B) which is forward by N pictures from the j-th picture b of the video data, and supplies the index data to the CPU 6. The CPU 6 instantaneously uses the index data to calculate the coding difficulty $D_j$ with respect to the I-picture, P-picture and B-picture on the basis of equations (1), (2) and (3). Thus, when the encoder 4 starts compression coding of the j-th picture of the delayed video data, the CPU 6 obtains the coding difficulties $D_j$ to $D_{j+N-1}$ with respect to N pictures from the picture j to the picture j+N−1.

Similarly, when the encoder 4 is compression-coding the (j+1)th picture (picture b' of FIG. 5C) of the delayed video data as shown in FIG. 5C, the CPU 6 obtains the coding difficulties $D_{j+1}$ to $D_{j+N}$ with respect to N pictures from the picture (j+1) to the picture (j+N).

In the TM5 (Test Model Editing Committee or "Test Model 5") system known as an MPEG compression algorithm, a statistic quantity referred to as activity is used to calculate the quantization value (MQUANT) of the macroblock. Since this activity has strong correlation with the coding difficulty $D_j$ similarly to the flatness and intra-AC, the coding difficulty $D_j$ may be found by using the activity instead of these index data.

The coding difficulty $D_j$ calculated by the CPU 6 using the index data including the activity is used for calculating the target quantity of codes $T_j$.

To simplify the description, it is assumed that the coding difficulties $D_{j+1}$ to $D_{j+N}$ obtained by the CPU 6 are for one GOP. It is also assumed that the number of pictures of one GOP is N. In short, when the encoder 4 encodes the picture j, the coding difficulties $D_j$ to $D_{j+N-1}$ with respect to N pictures from the picture j to the picture j+N−1 are obtained, as described above.

The processing by the CPU 6 for calculating the target quantity of codes $T_j$ using the coding difficulty $D_j$ roughly includes the following three types of processing.

The first processing is processing for finding the bit rate GOP_Bitrate of a reference GOP from the average value D⁻ of the coding difficulty $D_j$ in the GOP. This first processing is referred to as processing for finding the reference GOP bitrate GOP_Bitrate.

The second processing is processing for distributing the target quantity of codes allocated to the reference GOP in accordance with the ratio of the coding difficulties of the respective pictures, and determining the target quantity of codes $T_j$ for each picture. This second processing is referred to as processing for finding the target quantity of codes $T_j$ for each picture.

The third processing is processing for updating the operation expression for determining the bit rate from the coding difficulty used in the first processing, by using the quantity of generated codes and the coding difficulty after completion of encoding of the GOP. This third processing is referred to as processing for updating the operation expression for calculating the reference GOP bit rate GOP_Bitrate. The third processing is very characteristic and can provide such an encode algorithm as to satisfy the target quantity of codes while updating the relational expression.

The first processing will now be described in detail. This processing is adapted for determining the bit rate allocated to a reference GOP to be encoded from now on immediately before encoding the leading picture of the GOP, that is, an I-picture (j=0). Therefore, first, the average value D⁻ of the coding difficulty $D_j$ with respect to the reference GOP to be encoded from now on is found in accordance with the following equation (4).

$$\overline{D} = \frac{\sum_{j=0}^{N-1} D_j}{N} \quad (4)$$

In this equation, $\overline{D}$ is equal to D⁻ in the text, and $\overline{D}$ in the drawings is similarly equal to D⁻.

Figure 6:
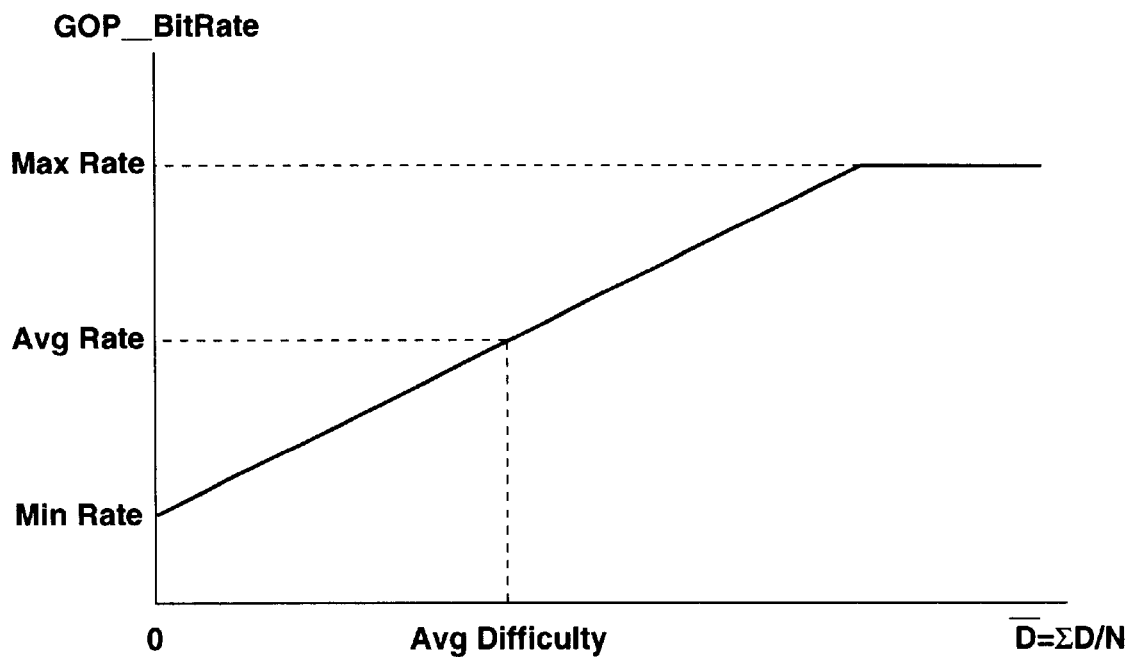
FIG. 6 is a graph of the GOP bit rate with respect to the coding difficulty for explaining the operation of the embodiment.

Then, using the relation between the average value D⁻ of the coding difficulty in this GOP and the reference GOP bit rate GOP_Bitrate as shown in FIG. 6, the bit rate to be allocated to the GOP is determined. FIG. 6 shows the relation between the average value D⁻ of the coding difficulty in this GOP and the reference GOP bit rate GOP_Bitrate, as described above. The lateral axis represents the average value D⁻ of the coding difficulty, and the longitudinal axis represents the reference GOP bit rate GOP_Bitrate. As seen from the relational expression of FIG. 6, as the average value D⁻ of the coding difficulty becomes greater, a greater bit rate is allocated to the reference GOP.

In the case where this video data coding device is applied to an authoring system or a storage system, Max Rate (Rate_max) and Min Rate (Rate_min) expressed on the longitudinal axis of the graph of FIG. 6 are the maximum bit rate and the minimum bit rate determined by the application, respectively. If the recording capacity Total_Bit of a storage medium used in the authoring system or the storage system and the length Total_Time of a video material to be recorded are predetermined, the average bit rate Avg Rate (Rate_Avg) expressed on the longitudinal axis is the average bit rate calculated from these parameters, and its initial value is calculated by the following equation.

Rate_Avg=Total_Bit[bits]/Total_Time[sec]

In the case where this video data coding device is applied to a transmission system of digital broadcast or the like, Max Rate (Rate_max) and Min Rate (Rate_min) expressed on the longitudinal axis of the graph of FIG. 6 are the maximum bit rate and the minimum bit rate, respectively, predetermined with respect to a video program to be transmitted. Similarly, the average bit rate Avg Rate (Rate_Avg) is a fixed bit rate preset with respect to the video program to be transmitted.

On the other hand, Avg Difficulty (D_Avg) expressed on the lateral axis is an estimate value of the average coding difficulty of an input video material to be encoded. The Avg Difficulty is referred to as the "estimate value" because the coding difficulty of the input video material is not known until encoding is completed.

Thus, provided with Rate_Min, Rate_Max, Rate_Avg and the average coding difficulty D_Avg, the bit rate GOP_Bitrate to be allocated to the reference GOP is expressed by a straight line which represents Rate_Min if the average value D⁻ of the coding difficulty in the reference GOP is equal to 0 and which represents Rate_Avg if the average value D⁻ is equal to D_Avg, and takes such a value that the bit rate does not exceed Rate_Max, as shown in FIG. 6. Thus, the bit rate GOP_Bitrate to be allocated to the reference GOP is expressed by the following equation.

$$\text{GOP\_Bitrate} = \min\left\{\text{Rate\_Min} + \frac{\text{Rate\_Avg\_Rate\_Min}}{\text{D\_Avg}} \times \overline{D}, \text{Rate\_Max}\right\} \quad (5)$$

When the GOP bit rate GOP_Bitrate is found in this first processing (processing for finding the reference GOP bit rate GOP_Bitrate), a target quantity of codes R for the reference GOP is found in accordance with the following equation (6) in the second processing (processing for finding the target quantity of codes $T_j$ for each picture).

$$R = \text{GOP\_Bitrate} \times \frac{N}{\text{Picture\_Rate}} \quad (6)$$

In this equation, Picture_Rate is the number of pictures for second.

Then, in this second processing, the bit quantity R per GOP found in accordance with equation (6) is distributed at the ratio of the coding difficulties of the respective pictures. That is, the bit quantity R per GOP is not distributed equally to each of N pictures in the GOP, but is distributed in an inclined manner so that the greatest quantity of coded bits is allocated to the I-picture and a quantity of bits smaller than that for the I-picture and greater than that for the B-picture is allocated to the P-picture while the smallest quantity of bits is allocated to the B-picture. Specifically, the target quantity of codes $T_j$ of the j-th picture in the GOP is determined as expressed by the following equations (7), (8) and (9), depending on the respective picture types.

The target quantity of bits which is allocated in coding a picture having the picture type of I-picture is found by equation (7).

$$T_j = \frac{K_P \times K_B \times D_j}{K_P \times K_B \times D_I + K_B \times \sum_{\text{P\_picturte}} D_P + K_P \times \sum_{\text{B\_picturte}} D_B} \times R \quad (7)$$

The target quantity of bits which is allocated in coding a picture having the picture type of P-picture is found by equation (8).

$$T_j = \frac{K_B \times D_j}{K_P \times K_B \times D_I + K_B \times \sum_{\text{P\_picturte}} D_P + K_P \times \sum_{\text{B\_picturte}} D_B} \times R \quad (8)$$

The target quantity of bits which is allocated in coding a picture having the picture type of B-picture is found by equation (9).

$$T_j = \frac{K_P \times D_j}{K_P \times K_B \times D_I + K_B \times \sum_{\text{P\_picturte}} D_P + K_P \times \sum_{\text{B\_picturte}} D_B} \times R \quad (9)$$

$D_I$, $D_P$, $D_B$, commonly used in the denominators of all the these equations (7), (8) and (9), express the coding difficulties corresponding to the respective picture types and are data calculated prior to coding processing. $K_P$ expresses the ratio of the bit quantity of the I-picture to the bit quantity of the P-picture, and $K_B$ expresses the ratio of the bit quantity of the I-picture to the bit quantity of the B-picture. For example, as proposed in the TM5 system, values such as $K_P=1.0$ and $K_B=1.4$ are selected.

To follow the limitation of calculation of a virtual buffer quantity (Video Buffering Verifier or VBV buffer) prescribed by MPEG, the value of the target quantity of codes $T_j$ is limited so as not to exceed the limitation of the VBV buffer even when a quantity of generated codes $T_j$ obtained by adding a certain marginal value to the bit quantity of the target quantity of codes $T_j$ is generated.

When the target quantity of codes $T_j$ corresponding to each picture is determined, pictures of one GOP are encoded in accordance with the target quantity of codes $T_j$.

Then, in the third processing, processing for updating equation (5) used in the first processing (processing for finding the reference GOP bit rate GOP_Bitrate), that is, processing for updating the operation expression for calculating the reference GOP bit rate GOP_Bitrate, is carried out.

In the third processing, the CPU 6 can obtain the quantity of actually generated bits in encoding the reference GOP, by encoding the reference GOP.

First, in the case where this video data coding device is used in an authoring system or a storage system, the CPU 6 finds the quantity of remaining bits of a storage medium used in the authoring system or storage system and the remaining time, by arithmetic processing. This is because the CPU 6 calculates the new optimum average bit rate Rate_avg based on the quantity of remaining bits of the storage medium and the non-recording time of the source material, before coding the next GOP after actually encoding the reference GOP.

The quantity of remaining bits Remain_Bit of the storage medium used in the authoring system or storage system is found by the following equation, where S represents the quantity of codes generated in encoding the reference GOP.

$$\text{Remain\_Bit} = \text{Remain\_Bit} - S \quad (10)$$

Subsequently, the non-recording time Remain_Time of the source material is found by the following equation, where Picture_Rate represents the number of pictures per second and N represents the number of picture per GOP.

$$\text{Remain\_Time} = \text{Remain\_Time} - (N/(\text{Picture\_Rate})) \quad (11)$$

Thus, the new average bit rate Rate_Avg updated by the quantity of remaining bits of the storage medium and the non-recording time of the source material can be found by the following equation.

$$\text{Rate\_Avg} = \text{Remain\_Bit}[\text{bits}]/\text{Remain\_Time}[\text{sec}] \quad (12)$$

The initial values of Remain_Bit and Remain_Time are the total quantity of storage bits Total_Bit of the storage medium and the total data length Total_Time of the source video material, respectively.

On the other hand, in the case where this video data coding device is used in a transmission system of digital broadcast or the like, unlike the foregoing case of the authoring system or storage system, processing for updating the average bit rate Rate_avg is not carried out for the following reason. That is, this average bit rate cannot be changed since the average bit rate is a value preset with respect to each video program to be transmitted and is a bit rate used by the broadcasting station for charging the fee to a program supplier company which has requested transmission of a video program.

On completion of encoding of one GOP, the average value $D^-$ of the coding difficulty in the next GOP is found before coding processing of the next GOP is carried out. The CPU 6 updates the estimate value D_Avg of the average coding difficulty set for the next GOP to be encoded, by using the average value $D^-$ of the coding difficulty in the present GOP.

The new estimate value D_Avg of the average coding difficulty used in coding the next GOP can be found by the following equation.

$$D\_Avg = \frac{(k-1) \times D\_Avg + \overline{D}}{k} \quad (13)$$

As in this equation (13), it is easy to weight the previous D_Avg (estimate value of the average coding difficulty used in coding processing of the previous GOP) to find the average. In this equation, the coefficient k is a sufficiently large integer (for example, 256). The magnitude of the coefficient k is a time constant of fluctuation of the average value. As the coefficient k becomes greater, the fluctuation of the average value becomes smaller, but it takes longer to reach the actual average value. Therefore, the magnitude of the coefficient k must be selected in accordance with the application.

As the initial value of the new estimate value D_Avg of the average coding difficulty, it can be considered to use a statistically found value. For example, it is appropriate to set a value which is assumed as the average coding difficulty of the input video material, as the initial value, depending on encode conditions (resolution/pull-down) and the type of the input video material (motion picture/video, sports/news, and the like). In the case of the motion picture material, since 2–3 pull-down and improvement in the compression efficiency by frame DCT can be obtained, the average value of the difficulty is generally much smaller than that of a video material. Therefore, it is appropriate to set a relatively small value as the initial value.

Figure 7:
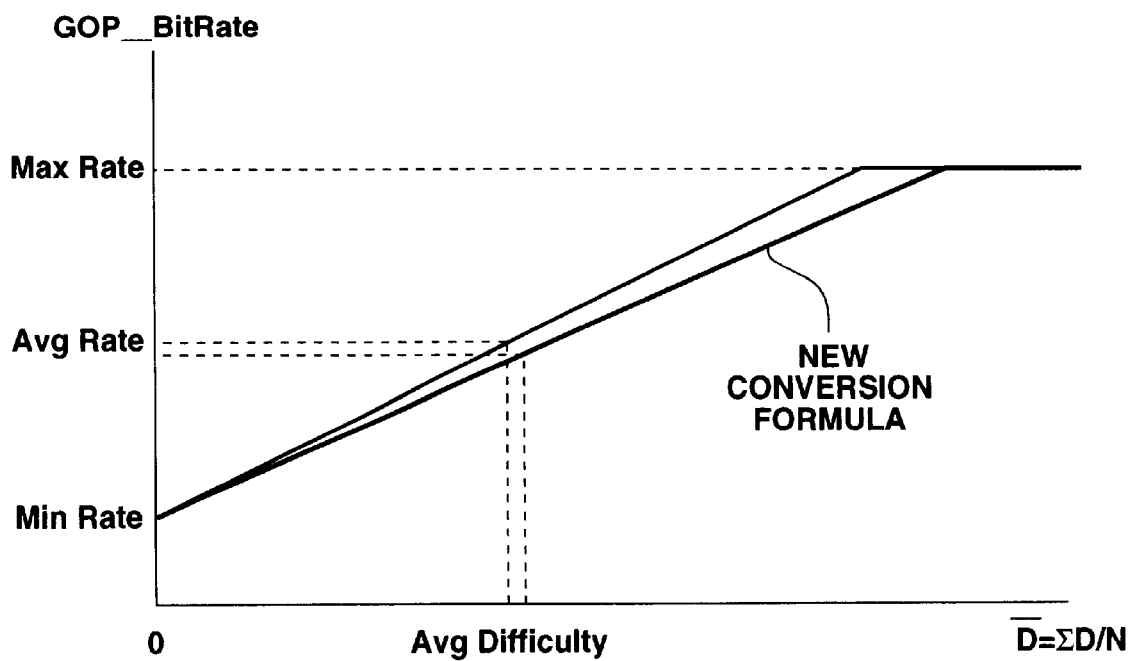
FIG. 7 is a graph showing the state where the graph of FIG. 6 is updated.

Meanwhile, when Rate_Avg and D_Avg are updated in accordance with equations (12) and (13) as a result of coding processing of the previous GOP, the conversion formula (5) for finding the GOP bit rate from the coding difficulty is updated on the basis of the updated Rate_Avg and D_Avg. Consequently, the conversion formula for finding the GOP bit rate from the coding difficulty is updated as shown in FIG. 7 and thus corrected to enable encoding within the range of the whole target quantity of codes. In the example of FIG. 7, since both the quantity of generated bits and the coding difficulty largely exceed the average value, Rate_Avg is reduced and D_Avg is increased to make the slope of the conversion formula (5) gentle.

In this third processing, when the new conversion formula with respect to equation (5) is found, the operation returns to the first processing to determine the target quantity of codes for the next GOP.

Figure 8:
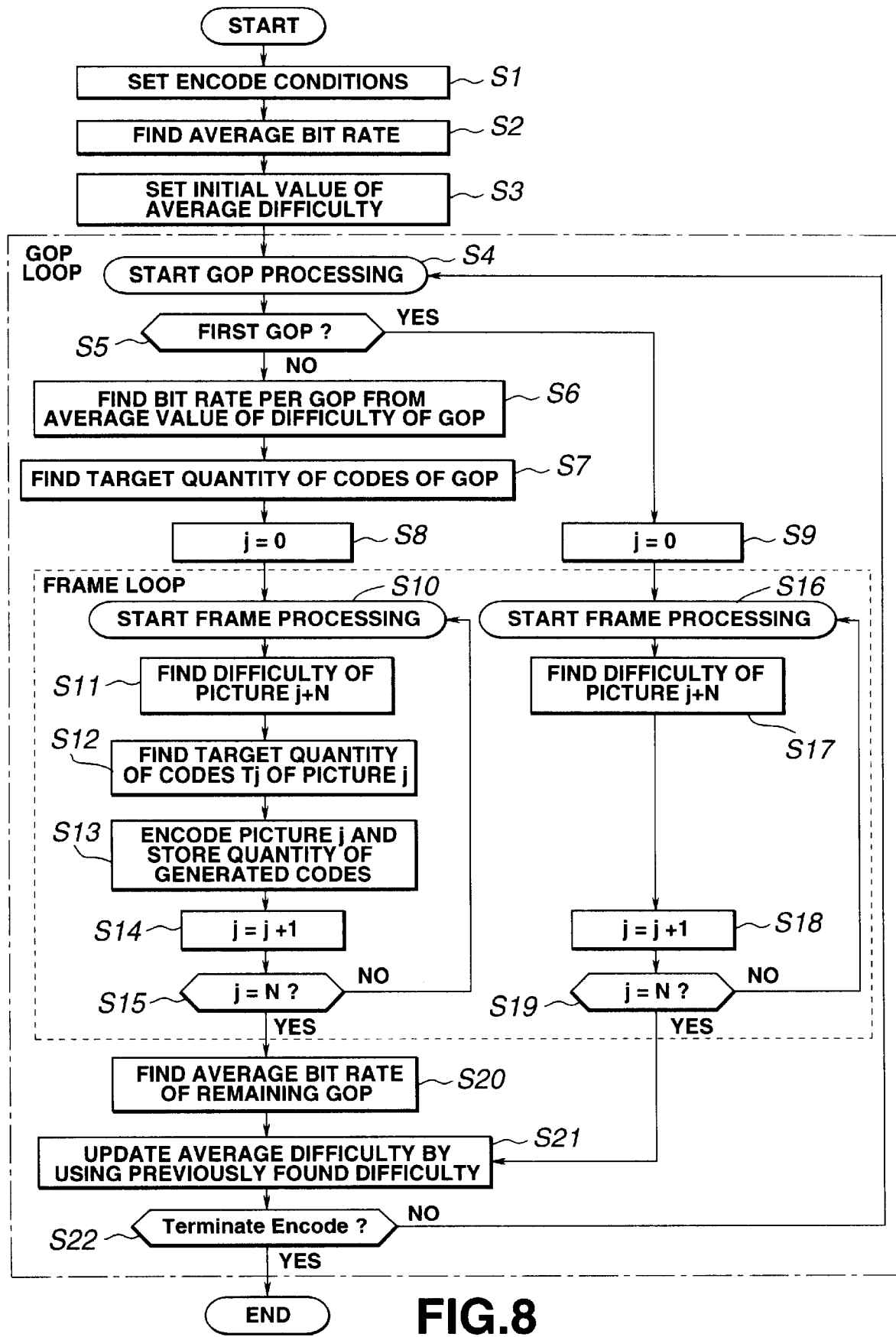
FIG. 8 is a flowchart for explaining the operation of the embodiment.

FIG. 8 is a flowchart showing detailed algorithms of the first to third processing.

The operation of this flowchart is executed by the CPU 6. First, at step S1, if this video data coding device is used in an authoring system or a storage system, the user sets encode conditions such as the total quantity of codes of a storage disk, the length of a video material, the maximum bit rate, the minimum bit rate, the type of the input video material, and the presence/absence of pull-down, through an input interface, not shown. On the basis of the input information, at step S2, the CPU 6 calculates the average bit rate Rate_Avg from the total quantity of codes Total_Bit of the disk and the temporal length Total_Time[sec] of the video material, in accordance with the following equation.

Rate_Avg=Total_Bit[bits]/Total_Time[sec]

If this video data coding device is applied to a data transmission system of digital broadcast or the like, a fixed bit rate required in advance with respect to a video program to be transmitted is set as the average bit rate Rate_Avg.

Then, at step S3, the CPU 6 sets the initial value of the estimate value D_Avg of the average coding difficulty of the source video material to be encoded, in accordance with the encode conditions (resolution/pull-down) and the type of the input video material (motion picture/video, news/sports, and the like).

Then, the CPU 6 starts GOP processing of step S4 and the subsequent steps. At step S5, if it is determined that the video signal input is the first GOP, the CPU 6 finds, at step S17, the coding difficulties $D_j$ to $D_{j+N}$ corresponding to the picture types in accordance with the above-mentioned equations (1), (2) and (3), by using the index data (intra-AC and ME residual) for j+N pictures supplied from the coding preprocessing section 2.

If it is determined at step S5 that the input is not the first GOP, the CPU 6 finds, at step S6, the average value $D^-$ of the coding difficulty in the reference GOP from the above-mentioned equation (4). In addition, the CPU 6 finds the bit rate GOP_Bitrate per GOP from the above-mentioned equation (5), by using the average value $D^-$ of the coding difficulty in this GOP. The processing up to this point corresponds to the first processing.

Then, at step S7, the CPU 6 finds the target quantity of codes R allocated to the reference GOP, by using equation (6).

Next, the CPU 6 sets j=0 at step S8 and starts frame loop processing from step S10 to step S15. At step S11, the CPU 6 finds the coding difficulty of the j+N pictures in accordance with equations (1), (2) and (3), by using the index data (intra-AC and ME residual) supplied from the coding preprocessing section 2.

At step S12, the CPU 6 finds the target quantities of codes $T_j$ corresponding to the respective pictures, that is, the I-picture, P-picture and B-picture, in accordance with equations (7) to (9). Specifically, the target quantity of codes R allocated to the reference GOP, found by equation (6), is weighted by a weighting coefficient K set for each picture type, thereby distributing the target quantity of codes to each picture. At this point, when there is no margin in the VBV buffer, the target quantity of codes $T_j$ calculated for each picture is clipped. That is, in the case where the target quantity of codes $T_j$ is greater than a value obtained by subtracting a margin from the buffer remaining quantity, the value of the calculated target quantity of codes $T_j$ is limited to prevent overflow of the VBV buffer.

Then, at step S13, the CPU 6 receives the quantity of generated codes generated by the encoder 4 in accordance with the target quantity of codes $T_j$, and stores this quantity of generated codes into a memory provided in the CPU 6. This series of processing is repeated until j=N is obtained at step S15, and the quantity of generated codes for one GOP is thus found. That is, encoding of one GOP is carried out. The processing up to this point corresponds to the second processing.

Next, the CPU 6 carries out processing corresponding to the third processing, at steps S20 and S21. At step S20, similar to step S2, the CPU 6 finds the average bit rate Rate_Avg in coding remaining pictures in the reference GOP, from the quantity of remaining bits Remain_Bit [bits] of the storage medium and the non-recording time Remain_Time [sec] of the source video material. This processing for finding the average bit rate Rate_Avg is carried out only in the case where coded data is to be recorded onto the storage medium.

At step S21, the CPU 6 finds a new average value $D^-$ of the coding difficulty corresponding to the next GOP by using the coding difficulty $D_j$ calculated before coding the next GOP, in accordance with equation (4), thereby updating the average value $D^-$ of the coding difficulty. Then, the CPU 6 updates the estimate value D_Avg of the average coding difficulty in coding the next GOP, as described in equation (13), in accordance with the updating of the coding difficulty average value $D^-$.

Thus, on the basis of the quantity of actually generated bits as a result of encode processing, the average bit rate Rate_Avg and the estimate value D_Avg of the average coding difficulty are updated. By entering these updated average bit rate Rate_Avg and estimate value D_Avg of the average coding difficulty into equation (5), the conversion formula for finding the GOP bit rate from the coding difficulty is changed, as shown in FIG. 7. Consequently, the conversion formula is corrected to enable encoding within the range of the whole target quantity of codes.

Then, the operation returns to the first processing to determined the target quantity of codes for the next GOP, until termination of encode processing is determined at step S22.

Figure 9:
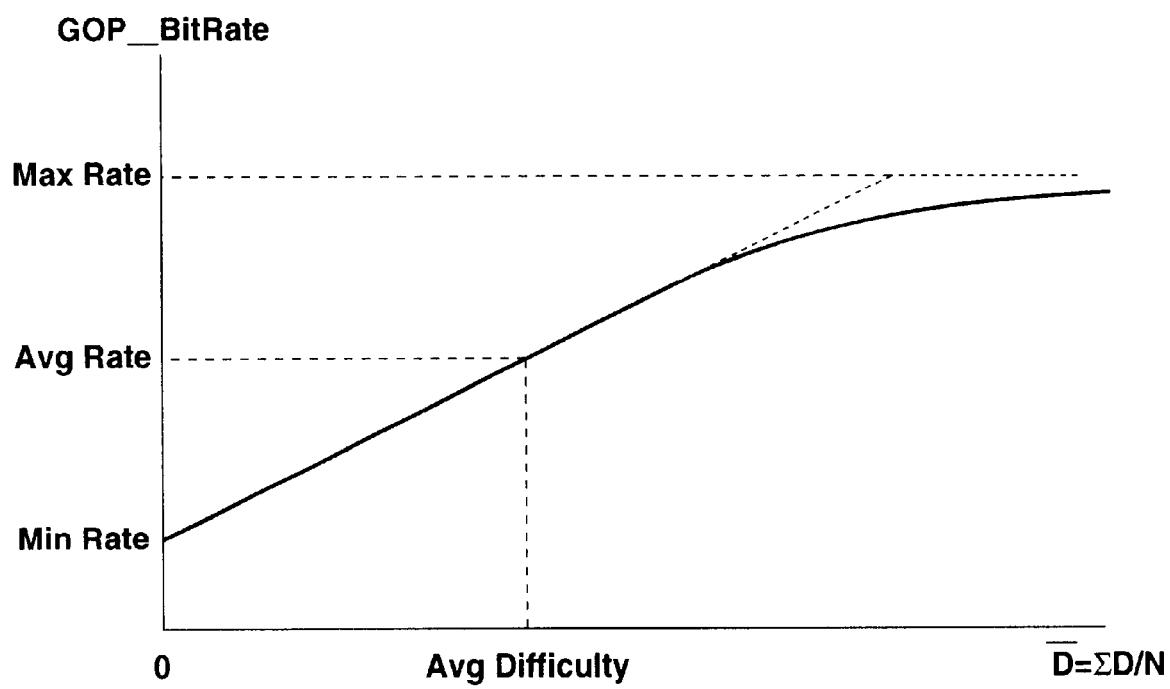
FIG. 9 is another graph of the GOP bit rate with respect to the coding difficulty.

In the flowchart, the relation between the coding difficulty and the bit rate is described as the linear relation as shown in FIGS. 6 and 7. In this invention, however, the relation between the coding difficulty and the bit rate need not be the linear relation and may be defined by a relational expression which has an exponentially gentle slope, as shown in FIG. 9.

In the embodiment of the present invention, the precedent reading algorithm for calculating (precedently reading) the coding difficulty $D_j$ for one GOP prior to coding processing on the GOP basis is described for simplification. However, precedent reading for the GOP is not necessarily required.

If the coding difficulty for one GOP cannot be precedently read, precedent reading for one frame (one picture) may be sufficient. In the first processing, the bit rate is determined in accordance with the coding difficulty on the GOP basis. However, if precedently read information of the GOP cannot be used, the target quantity of codes $T_j$ can be directly determined in accordance with the corresponding relation between the coding difficulty of a predetermined frame and the target quantity of codes for the frame. That is, the first processing and the second processing are carried out simultaneously.

Thus, in the algorithm for calculating the coding difficulty $D_j$ for the I-picture, the relational expression between the coding difficulty on the picture basis and the target quantity of codes is prepared for each picture type in this case. FIGS. 10A to 10C show examples thereof. The maximum and minimum target quantities of codes per picture with respect to the I-picture must be set to be greater than those for the P-picture and B-picture. Similarly, the average coding difficulty D_Avg and the average target quantity of codes Avg Bits which are updated in the third processing must be found for each picture type.

FIG. 10A is a graph showing the relational expression between the coding difficulty and the target quantity of codes for the I-picture. FIG. 10B is a graph showing the relational expression between the coding difficulty and the target quantity of codes for the P-picture. FIG. 10C is a graph showing the relational expression between the coding difficulty and the target quantity of codes for the B-picture.

In the description up to this point, even when a difference is generated in the quantity of generated codes with respect to the target quantity of codes on the picture basis or on the GOP basis, the difference is not immediately fed back but is moderately fed back in the form of updating the remaining average bit rate. This suffices in such an application that encoding for a relatively long time period is carried out to follow the target quantity, as in an authoring system or a storage system.

However, in the case where this video data coding device is applied to a transmission system of digital broadcast or the like, the target quantity of codes and the quantity of generated codes must be approximated to each other within a short time period, depending on the application. In such case, it is conceivable to actively feed back the difference between the bit quantity R allocated to one picture and the quantity of generated codes $S_j$, as in the TM5 system. That is, every time coding processing of one picture is completed, the bit quantity R allocated to the next picture is expressed by the following equation.

$$R = R - S_j$$

In short, the bit quantity R allocated to the next picture has a value obtained by subtracting the quantity of generated bits $S_j$ generated in coding the previous picture from the bit quantity R allocated to the previous picture.

The denominators of equations (7) to (9) may be calculated to find the sum of the coding difficulty of the remaining pictures in the GOP. Also, the difference can be fed back to the next GOP, by adding the value of the bit quantity R allocated to the picture on completion of the coding of the GOP to the bit quantity R allocated to the next GOP.

Although the example of weighting average (IIR filter) as in equation (13) is described as a method for finding the prediction value D_Avg of the average coding difficulty of the input video material, various other methods may be considered. In the following example, the average value of actually measured values of coding difficulty is used.

On the assumption that precedent reading of the coding difficulty of L pictures from the start of encoding is completed at a certain time point, the actual average value can be used as expressed by the following equation.

$$D\_Avg = \frac{\sum_{i=1}^{L} D_i}{L} \qquad (14)$$

This equation (14) assumes that the average value of the past measured coding difficulties can be similarly used for a material to be inputted from now on.

In this case, there is an advantage such that encoding for a long time period generates a value close to the accurate average value, whereas there is a drawback that the average value is excessively affected by the input material immediately after the start of encoding. In addition, if encoding is continued for a long time period, L becomes too large and increases the calculation quantity and the storage quantity.

As a special application example of the present invention, a one-pass fixed rate is included. Specifically, the one-pass fixed rate can be realized simply by setting the bit rate per GOP determined in the first processing of the present invention, constantly at a fixed value.

In the above-described embodiment, in accordance with the feed forward rate control system, the statistically calculated index data, that is, the ME residual, flatness, intra-AC and activity, are made approximate to the coding difficulty by the CPU 6. These used data and the coding difficulty have strong correlation. However, there may be some errors depending on the pattern of video data.

Therefore, by adaptively adjusting the weighting coefficients $a_I$, $a_P$, $a_B$ denoted in equations (1), (2) and (3) in accordance with the pattern of video data, the coding difficulty with high precision can be found from the index data. Thus, compressed video data of higher quality may be generated.

The processing for adaptively updating the weighting coefficients $a_I$, $a_P$, $a_B$ will now be described.

Every time the encoder 4 of the video data coding device of FIG. 2 completes compression coding of one picture, the CPU 6 learns the quantity of generated codes for one picture of the generated compressed video data, and can calculate the average value of quantization value $Q_j$ at the time of compression coding and the global complexity, which will be described hereinafter.

The global complexity is data indicating complexity of a video pattern, and is defined as a value obtained by multiplying the quantity of generated codes (data quantity) of compressed video data and the quantization value $Q_j$ in the MPEG TM5 system, as expressed by the following equations (15) to (17).

$$X_I = S_I \times Q_I \tag{15}$$

$$X_P = S_P \times Q_P \tag{16}$$

$$X_B = S_B \times Q_B \tag{17}$$

In equations (15) to (17), $X_I$, $X_P$, $X_B$ represent the global complexities of the I-picture, P-picture and B-picture, respectively, and $S_I$, $S_P$, $S_B$ represent the quantities of generated codes in coding the I-picture, P-picture and B-picture, respectively. $Q_I$, $Q_P$, $Q_B$ represent the average values of the quantization value $Q_j$ in generating the I-picture, the P-picture and B-picture, respectively.

The global complexity X expressed by equations (15) to (17) does not necessarily coincide with the coding difficulty. However, it coincides substantially with the coding difficulty unless the average value of the quantization value $Q_j$ is extremely large or small.

On the assumption that the index of the I-picture, P-picture and B-picture such as the intra-AC (or other parameters) and ME residual are proportional to the global complexity, proportional coefficients $\epsilon_I$, $\epsilon_P$, $\epsilon_B$ between these index data and the global complexity can be calculated by the following equations (18) to (20).

The proportional coefficient $\epsilon_I$ in coding a picture having the picture type of I-picture is expressed by the following equation.

$$\varepsilon_j^I = \frac{X_I}{\text{Intra\_AC}} \tag{18}$$

The proportional coefficient $\epsilon_P$ in coding a picture having the picture type of P-picture is expressed by the following equation.

$$\varepsilon_j^P = \frac{X_P}{\text{ME\_resid}} \tag{19}$$

The proportional coefficient $\epsilon_B$ in coding a picture having the picture type of B-picture is expressed by the following equation.

$$\varepsilon_j^B = \frac{X_B}{\text{ME\_resid}} \tag{20}$$

The coding difficulties corresponding to the respective pictures are calculated as expressed by the following equations (21) to (23), by using the proportional coefficients $\epsilon_I$, $\epsilon_P$, $\epsilon_B$ calculated by equations (18) to (20).

The coding difficulty $D^I_j$ in coding a picture having the picture type of I-picture is expressed by the following equation.

$$D^I_j = \epsilon^I_j \times \text{intra\_Ac}_j \tag{21}$$

The coding difficulty $D^P_j$ in coding a picture having the picture type of P-picture is expressed by the following equation.

$$D^P_j = \epsilon^P_j \times ME\_\text{resid}_j \tag{22}$$

The coding difficulty $D^B_j$ in coding a picture having the picture type of B-picture is expressed by the following equation.

$$D^B_j = \epsilon^B_j \times ME\_\text{resid}_j \tag{23}$$

As expressed in equations (21) to (23), the CPU 6 updates the proportional coefficients $\epsilon_I$, $\epsilon_P$, $\epsilon_B$ every time the encoder 4 compression-codes one picture, thereby finding the optimum coding difficulty D corresponding to each picture type. That is, by using the global complexity, the optimally approximated coding difficulty can be found constantly.

The CPU 6 carries out arithmetic processing of the algorithm of the flowchart of FIG. 8 with respect to the coding difficulties calculated in accordance with equations (21) to (23), thus calculating the target quantity of codes $T_j$.

The operation of the video data coding device for calculating the target quantity of codes from the coding difficulty found by using the global complexity and then determining the quantity of generated codes in accordance with the target quantity of codes will now be described.

The coding preprocessing section 2 of FIG. 2 rearranges the video signal input in the coding order, then carries out picture-field conversion, and calculates the statistic quantity such as the flatness and intra-AC from the (j+N)th picture which is to be compression-coded to an I-picture.

The motion detection circuit 5 generates motion vectors with respect to the (j+N)th picture which is to be compression-coded to a P-picture and a B-picture, and calculates the ME residual. The FIFO 3 delays the inputted video signal by the amount of N pictures.

With respect to a picture having the picture type of P-picture or B-picture, the CPU 6 carries out arithmetic processing of equation (22) or (23) using the ME residual generated by the motion detection circuit 5, thus calculating the coding difficulty. With respect to a picture having the picture type of I-picture, the CPU 6 carries out arithmetic processing of equation (21), thus finding the coding difficulty.

In addition, the CPU 6 calculates the target quantity of codes $T_j$ from the coding difficulty found for each picture, in accordance with the algorithm of FIG. 8, and sets this target quantity of codes $T_j$ to the quantization control circuit 18 shown in FIG. 3 of the encoder 4.

The DCT circuit 16 of the encoder 4 carries out DCT processing of the j-th picture of the delayed video data.

The quantization circuit 17 quantizes the data of the frequency domain of the j-th picture inputted from the DCT circuit 16, by using the quantization value $Q_j$ adjusted by the quantization control circuit 18 on the basis of the target quantity of codes $T_j$, and calculates the average value of the quantization value $Q_j$ used for compression coding of the j-th picture. Then, the quantization circuit 17 outputs the average value to the CPU 6.

The variable length coding circuit 19 carries out variable length coding of the j-th quantized data inputted from the quantization circuit 17, thus generating compressed video data of a data quantity substantially approximate to the target quantity of codes $T_j$. Then, the variable length coding circuit 19 outputs the compressed video data through the buffer memory 20.

When the encoder 4 completes compression coding of the j-th picture, the CPU 6 calculates the global complexity as expressed by equations (15) to (17) on the basis of the average value of the quantization value $Q_j$ with respect to the j-th picture inputted from the quantization control circuit 18 and the data quantity of the compression-coded j-th picture.

In addition, the CPU 6 updates the proportional coefficients $\epsilon_I$, $\epsilon_P$, $\epsilon_B$ as expressed by equations (18) to (20) by using the calculated global complexity. The updated proportional coefficients $\epsilon_I$, $\epsilon_P$, $\epsilon_B$ are reflected in the conversion formula in compression coding of the next picture.

Figure 11:
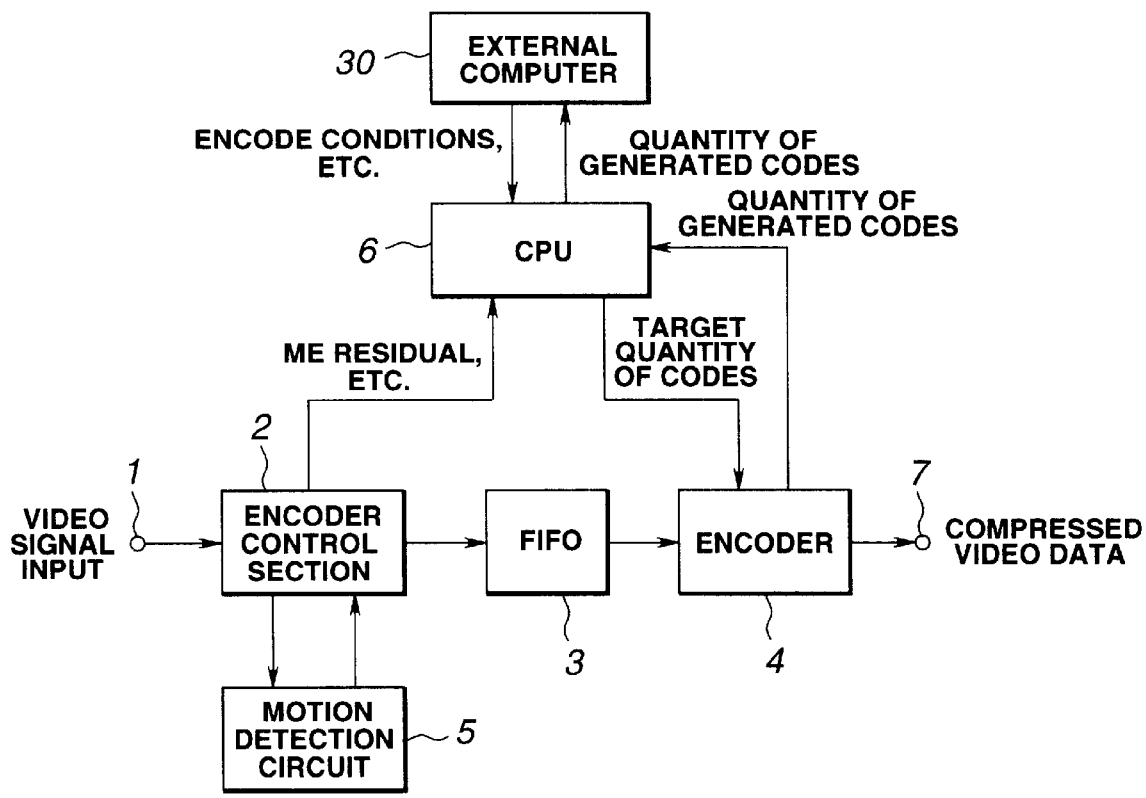
FIG. 11 is a block diagram showing another specific example of the video data coding device and method according to the present invention.
Figure 12:
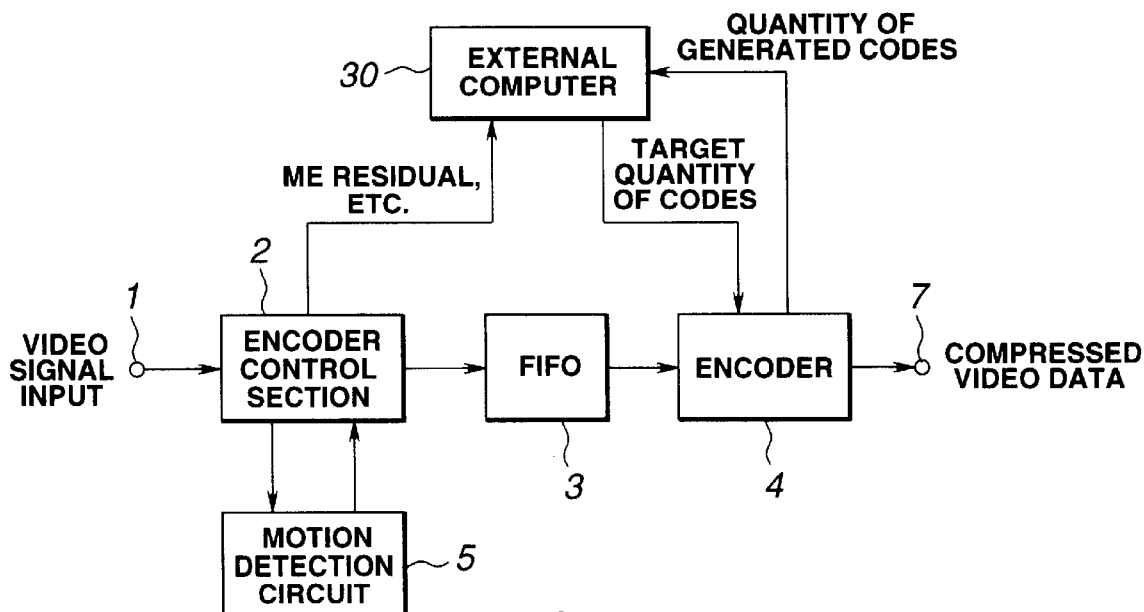
FIG. 12 is a block diagram showing still another specific example of the video data coding device and method according to the present invention.

Meanwhile, though the video data coding device of FIG. 2 has a structure such that the CPU 6 is mounted therein, an external computer 30 may also be provided externally, as shown in FIG. 11. In this case, encode conditions are provided from the external computer 30. The quantity of generated codes of the encoder 4 is notified of to the external computer 30 through the CPU 6. Alternatively, it is conceivable to cause only the external computer 30 to function in place of the CPU 6, as shown in FIG. 12.

A recording medium such as a DVD on which coded data obtained by the video data coding device and method is recorded provides good picture quality by effectively using the limited quantity of bits.

Also, in a video data transmitting method for transmitting coded data obtained by the coding method, data is transmitted after coding processing is carried out in accordance with the target quantity of codes calculated on the basis of the index data indexing characteristics of the input video signal. Thus, compression-coded data of good picture quality can be transmitted in real time.

As is described above, in the video data coding device and method according to the present invention, the CPU 6 calculates the coding difficulty $D_j$ indicating coding difficulty in coding source video data from the source video data to be coded itself, and calculates the target quantity of codes $T_j$ used in coding the source video data to be coded, on the basis of the calculated coding difficulty. Then, the CPU 6 supplies the calculated target quantity of codes $T_j$ to the encoder 4 in a manner of feed forward, thereby enabling coding based on the target quantity of codes corresponding to the pattern of the source video data to be coded and real-time coding of video data.

In addition, in the video data coding device according to the present invention, since the coding difficulty for each picture type is approximately calculated by using the intra-AC and ME residual found from the source video data to be coded, the coding difficulty can be obtained before actually encoding the video data to be coded. Thus, coding processing in real time can be realized.

Moreover, in the video data coding device according to the present invention, if the picture type of the video data to be coded is I-picture, the coding difficulty is calculated from the intra-AC, whereas if the picture type of the video data to be coded is P-picture or B-picture, the coding difficulty is calculated from the ME residual. Thus, the coding difficulty with high precision corresponding to the picture type can be calculated.

In addition, in the video data coding device according to the present invention, since the conversion formula for calculating the target quantity of codes from the calculated coding difficulty is constantly corrected on the basis of the quantity of codes actually generated as a result of the past coding processing by the coding means, the target quantity of codes adapted for changes of the video data pattern and the target quantity of codes corresponding to the remaining recording quantity of the storage medium can be set. Also, as the conversion formula for calculating the target quantity of codes from the coding difficulty, different conversion formulas are set in accordance with the picture types of the video data to be coded. Therefore, not only the coding difficulty on the GOP basis but also the optimum coding difficulty on the picture basis can be calculated.

Moreover, in the video data coding device according to the present invention, since the operation expression for calculating the coding difficulty is constantly updated on the basis of the global complexity found from the quantity of generated codes in coding processing by the coding means and the quantization value, the coding difficulty corresponding to changes of the video data pattern can be detected with higher precision.

Also, in the video data coding device according to the present invention, the CPU 6 calculates the coding difficulty for each of a plurality of pictures included in the reference GOP as a target of coding processing by the coding means, and calculates the target quantity of codes allocated to the reference GOP from the plurality of coding difficulties calculated by the coding difficulty calculation means. Then, the CPU 6 distributes the target quantity of codes allocated to the reference GOP, to each picture included in the reference GOP in accordance with the picture type, thereby calculating the target quantity of codes corresponding to each picture included in the reference GOP. Thus, within the GOP, different target quantities of codes corresponding to the picture types can be allocated to the respective pictures while the average quantity of codes designated to the GOP is maintained.

What is claimed is:

1. A video data coding device for coding input video data supplied thereto, the device comprising:

target quantity of codes calculation means for calculating a target quantity of codes to be distributed to the input video data on the basis of parameter data representing characteristics of the input video data;

delay means for delaying the input video data by a predetermined time period; and coding processing means, for carrying out coding processing in accordance with the target quantity of codes with respect to the input video data delayed by the delay means; wherein, the target quantity of codes calculation means finds a coding difficulty indicating the difficulty at the time of coding from the parameter data, and calculates the target quantity of codes to be distributed to the video data on the basis of the coding difficulty;

the coding processing means codes the input video data for each picture coding group including predetermined numbers of intra-pictures, predictive-pictures and bidirectionally predictive-pictures, and the target quantity of codes calculation means precedently reads the coding difficulty for each picture coding group, determines the target quantity of codes for each picture coding group by using the corresponding relation of the target quantity of codes based on the coding difficulty, distributes the target quantity of codes for each picture coding group in accordance with the ratio of coding difficulty for each coded picture, and determines the target quantity of codes for each coded picture.

2. The video data coding device as claimed in claim 1, wherein the parameter data is calculated by parameter data calculation means.

3. The video data coding device as claimed in claim 2, wherein the parameter data calculation means includes statistic quantity calculation means for calculating a statistic quantity selected from the group of flatness, intra-AC data or activity for a picture to be compression-coded to an intra-picture, and ME residual detection means for detecting an ME residual as a prediction error quantity of motion prediction for pictures to be compression-coded to a predictive-picture and a bidirectionally predictive-picture.

4. A video data coding device for coding input video data supplied thereto, the device comprising:
   target quantity of codes calculation means for calculating a target quantity of codes to be distributed to the input video data on the basis of parameter data representing characteristics of the input video data;
   delay means for delaying the input video data by a predetermined time period; and
   coding processing means, for carrying out coding processing in accordance with the target quantity of codes with respect to the input video data delayed by the delay means;
   wherein the target quantity of codes calculation means: (1) finds a coding difficulty indicating the difficulty at the time of coding from the parameter data, and calculates the target quantity of codes to be distributed to the video data on the basis of the coding difficulty; (2) updates, at any time, the corresponding relation of the target quantity of codes based on the coding difficulty, in accordance with coding difficulties that have already been determined and the quantity of codes generated by the coding processing means; and (3) defines the corresponding relation between the coding difficulty and the target quantity of codes as the corresponding relation determined by a minimum/maximum bit rate designated in advance, an average bit rate calculated from the recording capacity and the value of remaining time, and an average value of coding difficulty of an input material which is the input video data, and updates, at any time, both or either one of the average bit rate and the average value of coding difficulty.

5. The video data coding device as claimed in claim 4, wherein the target quantity of codes calculation means varies an initial value of the average value of coding difficulty of the input video material in accordance with the type of material, resolution and presence/absence of pull-down.

6. The video data coding device as claimed in claim 4, wherein the target quantity of codes calculation means updates, at any time, the average value of coding difficulty of the input video material by averaging the value of actually obtained coding difficulty and a previous average value, when the coding difficulty is actually obtained.

7. A video data coding method for coding input video data supplied thereto, the device comprising:
   a target quantity of codes calculation step of calculating a target quantity of codes to be distributed to the input video data on the basis of parameter data representing characteristics of the input video data;
   a delay step of delaying the input video data by a predetermined time period; and
   a coding processing step of carrying out coding processing in accordance with the target quantity of codes with respect to the input video data delayed at the delay step; wherein,
   at the target quantity of codes calculation step, a coding difficulty indicating the difficulty at the time of coding is found from the parameter data, and the target quantity of codes to be distributed to the video data is calculated on the basis of the coding difficulty;
   at the coding processing step, the input video data is coded for each picture coding group including predetermined numbers of intra-pictures, predictive-pictures and bidirectionally predictive-pictures, and,
   at the target quantity of codes calculation step, the coding difficulty is precedently read for each picture coding group, thus determining the target quantity of codes for each picture coding group by using the corresponding relation of the target quantity of codes based on the coding difficulty, and the target quantity of codes for each picture coding group is distributed in accordance with the ratio of coding difficulty for each coded picture, thus determining the target quantity of codes for each coded picture.

8. The video data coding method as claimed in claim 7, wherein flatness, intra-AC data and activity or a combination thereof is used as the parameter data for a picture to be compression-coded to an intra-picture, and wherein an ME residual as a prediction error quantity of motion prediction is used as the parameter data for pictures to be compression-coded to a predictive-picture and a bidirectionally predictive-picture.

9. A video data coding method for coding input video data supplied thereto, the device comprising:
   a target quantity of codes calculation step of calculating a target quantity of codes to be distributed to the input video data on the basis of parameter data representing characteristics of the input video data;
   a delay step of delaying the input video data by a predetermined time period; and
   a coding processing step of carrying out coding processing in accordance with the target quantity of codes with respect to the input video data delayed at the delay step;
   wherein at the target quantity of codes calculation step: (1) a coding difficulty indicating the difficulty at the time of coding is found from the parameter data, and the target quantity of codes to be distributed to the video data is calculated on the basis of the coding difficulty; (2) the corresponding relation of the target quantity of codes based on the coding difficulty is updated at any time, in accordance with coding difficulties that have already been determined and the quantity of codes generated at the coding processing step; and (3) the corresponding relation between the coding difficulty and the target quantity of codes is defined as the corresponding relation determined by a minimum/maximum bit rate designated in advance, an average bit rate calculated from the recording capacity and the value of remaining time, and an average value of coding difficulty of an input material which is the input video data, thus updating both or either one of the average bit rate and the average value of coding difficulty at any time.

10. The video data coding method as claimed in claim 9, wherein at the target quantity of codes calculation step, an initial value of the average value of coding difficulty of the input video material is varied in accordance with the type of material, resolution and presence/absence of pull-down.

11. The video data coding method as claimed in claim 9, wherein at the target quantity of codes calculation step, the average value of coding difficulty of the input video material is updated at any time by averaging the value of actually obtained coding difficulty and a previous average value, when the coding difficulty is actually obtained.

12. A video data coding device for coding source video data, the device comprising:
coding difficulty calculation means for calculating a coding difficulty indicating coding difficulty in coding the source video data, from source video data to be coded itself;
target quantity of codes calculation means for calculating a target quantity of codes used in coding the source video data to be coded, on the basis of the calculated coding difficulty; and
coding means for coding the source video data to be coded in real time on the basis of the target quantity of codes corresponding to the source video data to be coded, by feeding forward the target quantity of codes calculated by the target quantity of codes calculation means;
wherein the target quantity of codes calculation means calculates the target quantity of codes from the coding difficulty by using a conversion formula for calculating the target quantity of codes from the coding difficulty calculated by the coding difficulty calculation means, and corrects the value of the calculated target quantity of codes by correcting the conversion formula on the basis of a quantity of codes generated as a result of coding processing by the coding means.

13. The video data coding device as claimed in claim 12, wherein the coding difficulty calculation means calculates the coding difficulty on the basis of a statistic quantity found from the source video data to be coded.

14. The video data coding device as claimed in claim 12, wherein the coding difficulty calculation means calculates the coding difficulty for each picture type by using intra-AC or ME residual found from the source video data to be coded.

15. The video data coding device as claimed in claim 14, wherein the coding difficulty calculation means calculates the coding difficulty from the intra-AC in the case where the picture type of the video data to be coded is I-picture, and calculates the coding difficulty from the ME residual in the case where the picture type of the video data to be coded is P-picture or B-picture.

16. The video data coding device as claimed in claim 12, wherein as the conversion formula for calculating the target quantity of codes from the coding difficulty, different conversion formulas are set in accordance with picture types of the video data to be coded.

17. The video data coding device as claimed in claim 16, wherein the conversion formula for calculating the target quantity of codes from the coding difficulty is a conversion formula determined on the basis of the average complexity per coding unit period and the target quantity of codes per coding unit period, and wherein the conversion formula for calculating the target quantity of codes from the coding difficulty is corrected by varying the value of the average complexity per coding unit period.

18. A video data coding device for coding source video data, the device comprising:
coding difficulty calculation means for calculating a coding difficulty indicating coding difficulty in coding the source video data, from source video data to be coded itself;
target quantity of codes calculation means for calculating a target quantity of codes used in coding the source video data to be coded, on the basis of the calculated coding difficulty; and
coding means for coding the source video data to be coded in real time on the basis of the target quantity of codes corresponding to the source video data to be coded, by feeding forward the target quantity of codes calculated by the target quantity of codes calculation means;
wherein the coding difficulty calculation means updates, at any time, an operation expression for calculating the coding difficulty on the basis of coding results of coding processing by the coding means.

19. A video data coding device for coding source video data, the device comprising:
coding difficulty calculation means for calculating a coding difficulty indicating coding difficulty in coding the source video data, from source video data to be coded itself;
target quantity of codes calculation means for calculating a target quantity of codes used in coding the source video data to be coded, on the basis of the calculated coding difficulty; and
coding means for coding the source video data to be coded in real time on the basis of the target quantity of codes corresponding to the source video data to be coded, by feeding forward the target quantity of codes calculated by the target quantity of codes calculation means;
wherein the coding difficulty calculation means updates, at any time, an operation expression for calculating the coding difficulty on the basis of global complexity found from the quantity of generated codes and the quantization value of coding processing by the coding means.

20. A video data coding device for coding source video data, the device comprising:
coding difficulty calculation means for calculating a coding difficulty indicating coding difficulty in coding the source video data, from source video data to be coded itself;
target quantity of codes calculation means for calculating a target quantity of codes used in coding the source video data to be coded, on the basis of the calculated coding difficulty; and
coding means for coding the source video data to be coded in real time on the basis of the target quantity of codes corresponding to the source video data to be coded, by feeding forward the target quantity of codes calculated by the target quantity of codes calculation means;
wherein the target quantity of codes calculation means calculates the target quantity of codes allocated to a reference picture as a target of coding processing from the coding difficulty calculated by the coding difficulty calculation means, on the basis of a plurality of different conversion formulas which are formulas for calculating the target quantity of codes from the coding difficulty and are set for respective picture types.

21. The video data coding device as claimed in claim 20, wherein in the plurality of conversion formulas set for respective picture types, different maximum values for respective pictures for limiting an upper limit of the target quantity of codes are set.

22. A video data coding device for coding source video data, the device comprising:
coding difficulty calculation means for calculating a coding difficulty indicating coding difficulty in coding the source video data, from source video data to be coded itself;
target quantity of codes calculation means for calculating a target quantity of codes used in coding the source video data to be coded, on the basis of the calculated coding difficulty; and coding means for coding the source video data to be coded in real time on the basis of the target quantity of codes corresponding to the source video data to be coded, by feeding forward the target quantity of codes calculated by the target quantity of codes calculation means;

wherein the coding difficulty calculation means calculates the coding difficulty for each of a plurality of pictures included in a coding unit period of the coding means, and wherein the target quantity of codes calculation means calculates the target quantity of codes allocated to the coding unit period from a plurality of coding difficulties calculated by the coding difficulty calculation means, and calculates the target quantity of codes corresponding to each picture by distributing the target quantity of codes allocated to the coding unit period, to each picture included in the coding unit period in accordance with the picture type.

23. A video data coding device for coding source video data, the device comprising:

coding difficulty calculation means for calculating a coding difficulty indicating coding difficulty in coding the source video data, from source video data to be coded itself;

target quantity of codes calculation means for calculating a target quantity of codes used in coding the source video data to be coded, on the basis of the calculated coding difficulty; and coding means for coding the source video data to be coded in real time on the basis of the target quantity of codes corresponding to the source video data to be coded, by feeding forward the target quantity of codes calculated by the target quantity of codes calculation means;

wherein the coding difficulty calculation means calculates the coding difficulty for each of a plurality of pictures included in a reference GOP as a target of coding processing by the coding means, and wherein the target quantity of codes calculation means calculates the target quantity of codes allocated to the reference GOP from a plurality of coding difficulties calculated by the coding difficulty calculation means, and calculates the target quantity of codes corresponding to each picture included in the reference GOP by distributing the target quantity of codes allocated to the reference GOP, to each picture included in the reference GOP.

24. A video data coding device for coding source video data, the device comprising:

coding difficulty calculation means for calculating a coding difficulty indicating coding difficulty in coding the source video data, from source video data to be coded itself;

target quantity of codes calculation means for calculating a target quantity of codes used in coding the source video data to be coded, on the basis of the calculated coding difficulty; and coding means for coding the source video data to be coded in real time on the basis of the target quantity of codes corresponding to the source video data to be coded, by feeding forward the target quantity of codes calculated by the target quantity of codes calculation means;

wherein the coding difficulty calculation means calculates the coding difficulty for each of a plurality of pictures included in a reference GOP as a target of coding processing by the coding means, and wherein the target quantity of codes calculation means calculates an average value of coding difficulty in the reference GOP from a plurality of coding difficulties calculated by the coding difficulty calculation means, then calculates the target quantity of codes allocated to the reference GOP from the calculated average value of coding difficulty, and calculates the target quantity of codes corresponding to each picture by distributing the target quantity of codes allocated to the reference GOP, to each picture included in the reference GOP.

* * * * *